United States Patent
Gschwind et al.

(10) Patent No.: US 10,055,230 B2
(45) Date of Patent: *Aug. 21, 2018

(54) ACCURATE TRACKING OF TRANSACTIONAL READ AND WRITE SETS WITH SPECULATION

(71) Applicant: International Business Machines Corporation, Armonk, NY (US)

(72) Inventors: Michael Karl Gschwind, Chappaqua, NY (US); Valentina Salapura, Chappaqua, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 237 days.

This patent is subject to a terminal disclaimer.

(21) Appl. No.: 14/841,790

(22) Filed: Sep. 1, 2015

(65) Prior Publication Data

US 2015/0378739 A1 Dec. 31, 2015

Related U.S. Application Data

(63) Continuation of application No. 14/317,371, filed on Jun. 27, 2014, now Pat. No. 9,477,481.

(51) Int. Cl.
*G06F 9/30* (2006.01)
*G06F 9/38* (2018.01)

(52) U.S. Cl.
CPC ........ *G06F 9/3861* (2013.01); *G06F 9/30087* (2013.01); *G06F 9/3842* (2013.01); *G06F 9/3859* (2013.01); *G06F 9/3863* (2013.01)

(58) Field of Classification Search
None
See application file for complete search history.

(56) References Cited

U.S. PATENT DOCUMENTS 5,586,297 A 12/1996 Bryg et al.
5,664,148 A 9/1997 Mulla et al.
(Continued)

FOREIGN PATENT DOCUMENTS

WO 2013016186 A2 1/2013

OTHER PUBLICATIONS

IBM, "List of IBM Patents or Patent Applications Treated as Related (Appendix P)," Sep. 10, 2015, p. 1-2.
(Continued)

*Primary Examiner* — William B Partridge
(74) *Attorney, Agent, or Firm* — Reza Sarbakhsh

(57) ABSTRACT

Improving the tracking of read sets and write sets associated with cache lines of a transaction in a pipelined processor executing memory instructions having the read sets and write sets associated with the cache lines is provided. Included is active read set and write set cache indicators associated with the memory operation of executing memory instructions and associated with a recovery pool based on memory instructions being not-speculative are updated when the memory instruction is not-newer in program order than an un-resolved branch instruction. Based on encountering a speculative branch instruction in the processor pipeline, a representation of the active read sets and write sets is copied to the recovery pool. Based on completing the speculative branch instruction, updating the active read sets and write sets from the representations copied to the recovery pool associated with the branch instruction upon a detection of a misprediction.

6 Claims, 15 Drawing Sheets

(56) References Cited

U.S. PATENT DOCUMENTS

| | | | |
|---|---|---|---|
| 5,802,572 | A | 9/1998 | Patel et al. |
| 5,845,327 | A | 12/1998 | Rickard et al. |
| 6,321,302 | B1 | 11/2001 | Strongin et al. |
| 6,349,361 | B1 | 2/2002 | Altman et al. |
| 6,961,847 | B2 | 11/2005 | Davies et al. |
| 7,055,021 | B2 | 5/2006 | Kadambi |
| 7,269,694 | B2 | 9/2007 | Tremblay et al. |
| 7,389,383 | B2 | 6/2008 | Tremblay et al. |
| 7,395,382 | B1 | 7/2008 | Moir |
| 7,496,716 | B2 | 2/2009 | Dice et al. |
| 7,676,636 | B2 | 3/2010 | Cypher et al. |
| 7,810,085 | B2 | 10/2010 | Shinnar et al. |
| 7,890,725 | B2 | 2/2011 | von Praun et al. |
| 7,917,698 | B2 | 3/2011 | Cypher et al. |
| 8,074,030 | B1 | 12/2011 | Moir et al. |
| 8,195,898 | B2 | 6/2012 | Welc et al. |
| 8,209,499 | B2 | 6/2012 | Chou |
| 8,301,849 | B2 | 10/2012 | Rajwar et al. |
| 8,301,870 | B2 | 10/2012 | Kailas |
| 8,352,712 | B2 | 1/2013 | Bell, Jr. et al. |
| 8,364,909 | B2 | 1/2013 | Chakrabarti |
| 2004/0044850 | A1 | 3/2004 | George et al. |
| 2007/0245099 | A1 | 10/2007 | Gray et al. |
| 2008/0005737 | A1 | 1/2008 | Saha et al. |
| 2008/0270745 | A1 | 10/2008 | Saha et al. |
| 2009/0006767 | A1 | 1/2009 | Saha et al. |
| 2009/0031310 | A1 | 1/2009 | Lev et al. |
| 2009/0172305 | A1 | 7/2009 | Shpeisman et al. |
| 2009/0172317 | A1 | 7/2009 | Saha et al. |
| 2010/0058344 | A1 | 3/2010 | Ni et al. |
| 2010/0169623 | A1 | 7/2010 | Dice |
| 2011/0145512 | A1 | 6/2011 | Adl-Tabatabai et al. |
| 2011/0145553 | A1 | 6/2011 | Levanoni et al. |
| 2011/0153960 | A1 | 6/2011 | Rajwar et al. |
| 2011/0246725 | A1 | 10/2011 | Moir et al. |
| 2012/0079204 | A1 | 3/2012 | Chachad et al. |
| 2012/0144126 | A1 | 6/2012 | Nimmala et al. |
| 2012/0159461 | A1 | 6/2012 | Nakaike |
| 2012/0174083 | A1 | 7/2012 | Shpeisman et al. |
| 2012/0227045 | A1 | 9/2012 | Knauth et al. |
| 2012/0233411 | A1 | 9/2012 | Pohlack et al. |
| 2012/0297152 | A1 | 11/2012 | Saha et al. |
| 2012/0311246 | A1 | 12/2012 | McWilliams et al. |
| 2012/0324447 | A1 | 12/2012 | Huetter et al. |

OTHER PUBLICATIONS

Gschwind et al., "Accurate Tracking of Transactional Read and Write Sets With Speculation," Filed on Jun. 27, 2014, 79 Pages, U.S. Appl. No. 14/317,371.

Proceedings 2012 IEEE/ACM 45th International Symposium on Microarchitecture MICRO-45, presented Dec. 1-5, 2012, "Transactional Memory Architecture and Implementation for IBM System z", pp. 25-36.

McDonald, "Architectures for Transactional Memory", A Dissertation Submitted to the Department of Computer Science and the Committee on Graduate Studies of Stanford University in Partial Fulfillment of the Requirements for the Degree of Doctor of Philosophy, Jun. 2009, pp. 1-145.

Shriraman et al., "Implementation tradeoffs in the design of flexible transactional memory support*" *This work was supported in part by NSF grants CCF-0702505, CCR-0204344, CNS-0411127, CNS-0615139, CNS-0834451, and CNS-0509270; NIH grants 5 R21 GM079259-02 and 1 R21 HG004648-01; an IBM Faculty Partnership Award; equipment support from Sun Microsystems Laboratories; and financial support from Intel and Microsoft, Journal of Parallel and Distributed Computing, vol. 70, Issue 10, Oct. 2010, pp. 1068-1084, © 2010.

U.S. Appl. No. 14/317,370, filed Jun. 27, 2014, entitled: "Managing Read Tags in a Transactional Memory,".

U.S. Appl. No. 14/317,371, filed Jun. 27, 2014, entitled: "Accurate Tracking of Transactional Read and Write Sets With Speculation,".

U.S. Appl. No. 14/317,376, filed Jun. 27, 2014, entitled: "Transactional Execution in a Multi-Processor Environment That Monitors Memory Conflicts in a Shared Cache,".

U.S. Appl. No. 14/317,382, filed Jun. 27, 2014, entitled: "Allowing Non-Cacheable Loads Within a Transaction,".

U.S. Appl. No. 14/317,391, filed Jun. 27, 2014, entitled: "Conditional Inclusion of Data in a Transactional Memory Read Set,".

U.S. Appl. No. 14/317,394, filed Jun. 27, 2014, entitled "Detecting Cache Conflicts by Utilizing Logical Address Comparisons in a Transactional Memory,".

U.S. Appl. No. 14/317,415, filed Jun. 27, 2014, entitled: "Transactional Execution Processor Having a Co-Processor Accelerator, Both Sharing a Higher Level Cache,".

U.S. Appl. No. 14/317,417, filed Jun. 27, 2014, entitled: "Improving Memory Performance When Speculation Control is Enabled, and Instruction Therefor,".

U.S. Appl. No. 14/317,422, filed Jun. 27, 2014, entitled: "Co-Processor Memory Accesses in a Transactional Memory,".

U.S. Appl. No. 14/317,444, filed Jun. 27, 2014, entitled: "Co-Processor Memory Accesses in a Transactional Memory,".

U.S. Appl. No. 14/317,446, filed Jun. 27, 2014, entitled: "Allocating Read Blocks to a Thread in a Transaction Using User Specified Logical Addresses,".

U.S. Appl. No. 14/317,463, filed Jun. 27, 2014, entitled: "Speculation Control for Improving Transaction Success Rate, and Instruction Therefor,".

Del Barrio, "Optimizing Signatures in Hardware Transactional Memory Systems", Doctoral Thesis for Doctor of Philosophy, Department of Computer Science, University of Malaga, Oct. 2012 (Best Date Available), pp. 1-192.

Moravan et al., "Supporting Nested Transactional Memory in LogTM"; Appears in the proceedings of the Twelfth International Conference on Architectural Support for Programming Languages and Operating Systems, University of Wisconsin, ASPLOS, Oct. 25, 2006, pp. 1-41.

Berke et al., "A Cache Technique for Synchronization Variables in Highly Parallel, Shared Memory Systems", Original Publication Date: Dec. 31, 1988, An IP.com Prior Art Database Technical Disclosure, IP.com No. IPCOM000128199D, IP.com Electronic Publication: Sep. 15, 2005, pp. 1-17.

Jacobi et al., "Transactional Memory Architecture and Implementation for IBM System z" Proceedings 2012 IEEE/ACM 45th International Symposium on Microarchitecture MICRO-45, presented Dec. 1-5, 2012, Published: Dec. 2012 (Best Date Available), pp. 25-36.

IBM, "z/Architecture, Principles of Operation", Tenth Edition, Sep. 2012 (Best Date Available), Reference No. SA22-7832-09, Total pp. 1-1568.

"Intel® Architecture Instruction Set Extensions Programming Reference", Reference No. 319433-012A, Feb. 2012 (Best Date Available), pp. 1-604.

Zyulkyarov et al., Transaction Processing Core for Accelerating Software Transactional Memory, Barcelona Supercomputing Center, Barcelona Spain, Microsoft Research Cambridge UK, Department d'Arquitectura de Computadors Technical Report UPCDACRRGEN20075, Aug. 2007 (Best Date Available), <https://www.ac.upc.edu/app/research-reports/html/2007/44/>, pp. 1-24.

Mak et al., "IBM System z10 Processor Cache Subsystem Microarchitecture", IBM J. Res. & Dev. vol. 53, No. 1, Paper 2, Published Date: Jan. 2009 (Best Date Available), pp. 1-12.

IBM, "DB Write Accelerator", An IP.com Prior Art Database Technical Disclosure, Original Publication Date: Oct. 24, 2007, IP.com No. IPCOM000159668D, IP.com Electronic Publication: Oct. 24, 2007, pp. 1-4.

Marandola et al., "Enhancing Cache Coherent Architectures with Access Patterns for Embedded Manycore Systems", AN-13172273, International Symposium on System on Chip (Soc), Oct. 10-12, 2012, Tampere, Published by IEEE, Oct. 2012 (Best Date Available), pp. 1-7.

Morad et al., "Generalized MultiAmdahl: Optimization of Heterogeneous Multi-Accelerator SoC", CCIT Report #812, Sep. 2012 (Best Date Available), pp. 1-1.

(56) References Cited

OTHER PUBLICATIONS

Suh et al., "Soft Error Benchmarking of L2 Caches with PARMA", SIGMETRICS '11, Jun. 7-11, 2011, San Jose, California, USA, Copyright 2011 (Best Date Available), ACM, pp. 1-12.

Disclosed Anonymously, "File Service Definition Language", An IP.com Prior Art Database Technical Disclosure, IP.com No. IPCOM000212123D, IP.com Electronic Publication: Oct. 31, 2011, pp. 1-7.

Minh et al., "An Effective Hybrid Transactional Memory System with Strong Isolation Guarantees", ISCA '07, Jun. 9-13, 2007, San Diego, California, Copyright 2007 (Best Date Available), ACM, pp. 1-12.

Saha et al, "Architectural Support for Software Transactional Memory", Proceedings of the 39th Annual IEEE/ACM International Symposium on Microarchitecture (MICRO '06), Dec. 9-13, 2006, Orlando, Florida, Copyright 2006 IEEE (Best Date Available), pp. 1-12.

Casper et al. "Hardware Acceleration of Transactional Memory on Commodity Systems", ASPOLS '11, Mar. 5-11, 2011, Newport Beach, California, Conference Paper available: Mar. 2011, Copyright 2011 (Best Date Available), ACM, pp. 1-12.

Blake et al., "Bloom Filter Guided Transaction Scheduling", 2011 IEEE 17th International Symposium on High Performance Computer Architecture, Feb. 12-16, 2011, San Antonio, TX, Conference Paper available: Jan. 2011 (Best Date Available), Publisher: IEEE, 2011, pp. 1-12.

Monash, "Memory-Centric Data Management", Monash Information Services, Version 1.01, May 2006 (Best Date Available), © Monash Information Services, 2006, pp. 1-38.

ACCURATE TRACKING OF TRANSACTIONAL READ AND WRITE SETS WITH SPECULATION

BACKGROUND

The present embodiment relates generally to transactional execution, and more specifically to the accurate tracking of transactional read and write sets with speculation.

The number of central processing unit (CPU) cores on a chip and the number of CPU cores connected to a shared memory continues to grow significantly to support growing workload capacity demand. The increasing number of CPUs cooperating to process the same workloads puts a significant burden on software scalability; for example, shared queues or data-structures protected by traditional semaphores become hot spots and lead to sub-linear n-way scaling curves. Traditionally this has been countered by implementing finer-grained locking in software, and with lower latency/higher bandwidth interconnects in hardware. Implementing fine-grained locking to improve software scalability can be very complicated and error-prone, and at today's CPU frequencies, the latencies of hardware interconnects are limited by the physical dimension of the chips and systems, and by the speed of light.

Implementations of hardware Transactional Memory (TM) have been introduced, wherein a group of instructions, called a transaction, operate atomically and in isolation (sometimes called "serializability") on a data structure in memory. The transaction executes optimistically without obtaining a lock, but may need to abort and retry the transaction execution if an operation, of the executing transaction, on a memory location conflicts with anther operation on the same memory location. Previously, software transactional memory implementations have been proposed to support software Transactional Memory (TM). However, hardware TM can provide improved performance aspects and ease of use over software TM.

U.S. Patent Application Publication No 2012/01599461 titled "Program Optimizing Apparatus, Program Optimizing Method, And Program Optimizing Article Of Manufacture" filed 2012 Jun. 21 and incorporated by reference herein teaches An apparatus having a transactional memory enabling exclusive control to execute a transaction. The apparatus includes: a first code generating unit configured to interpret a program, and generate first code in which a begin instruction to begin a transaction and an end instruction to commit the transaction are inserted before and after an instruction sequence including multiple instructions to execute designated processing in the program; a second code generating unit configured to generate second code at a predetermined timing by using the multiple instructions according to the designated processing; and a code write unit configured to overwrite the instruction sequence of the first code with the second code or to write the second code to a part of the first code in the transaction.

U.S. Patent 2011/0246725 titled "System and Method for Committing Results of a Software Transaction Using a Hardware Transaction" filed 2011 Oct. 6 and incorporated by reference herein teaches. The system and methods described herein may exploit hardware transactional memory to improve the performance of a software or hybrid transactional memory implementation, even when an entire user transaction cannot be executed within a hardware transaction. The user code of an atomic transaction may be executed within a software transaction, which may collect read and write sets and/or other information about the atomic transaction. A single hardware transaction may be used to commit the atomic transaction by validating the transaction's read set and applying the effects of the user code to memory, reducing the overhead associated with commitment of software transactions. Because the hardware transaction code is carefully controlled, it may be less likely to fail to commit Various remedial actions may be taken before retrying hardware transactions following some failures. If a transaction exceeds the constraints of the hardware, it may be committed by the software transactional memory alone.

SUMMARY

Improving the tracking of read sets and write sets associated with cache lines of a transaction in a pipelined processor executing memory instructions having the read sets and write sets associated with the cache lines is provided. Included is active read set and write set cache indicators associated with the memory operation of executing memory instructions and associated with a recovery pool based on memory instructions being not-speculative are updated when the memory instruction is not-newer in program order than an un-resolved branch instruction. Based on encountering a speculative branch instruction in the processor pipeline, a representation of the active read sets and write sets is copied to the recovery pool. Based on completing the speculative branch instruction, updating the active read sets and write sets from the representations copied to the recovery pool associated with the branch instruction upon a detection of a misprediction.

BRIEF DESCRIPTION OF THE SEVERAL VIEWS OF THE DRAWINGS

These and other objects, features and advantages of the present embodiment will become apparent from the following detailed description of illustrative embodiments thereof, which is to be read in connection with the accompanying drawings. The various features of the drawings are not to scale as the illustrations are for clarity in facilitating one skilled in the art in understanding the embodiment in conjunction with the detailed description. In the drawings.

DETAILED DESCRIPTION

Figure 2:
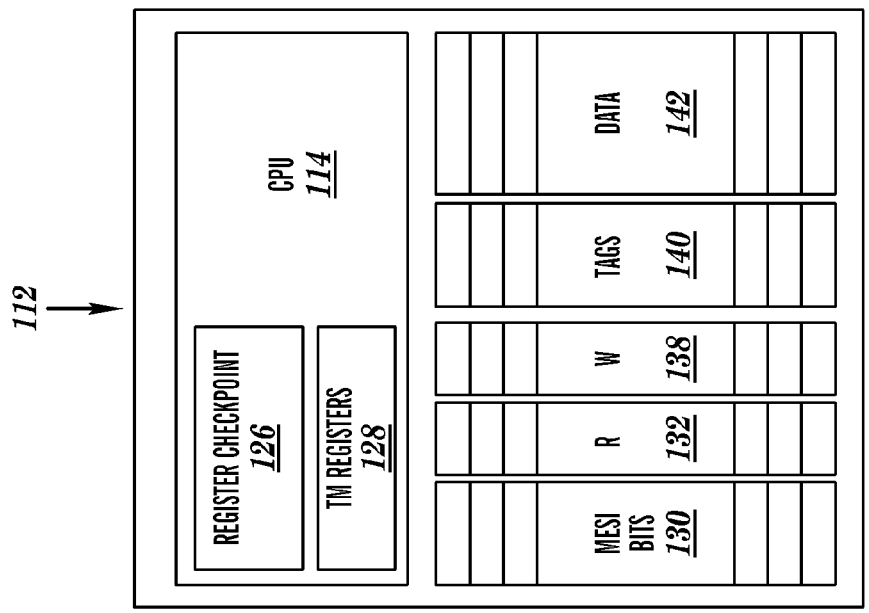
FIGS. 1 and 2 depict an example multicore Transactional Memory environment, in accordance with present embodiments.

Historically, a computer system or processor had only a single processor (aka processing unit or central processing unit). The processor included an instruction processing unit (IPU), a branch unit, a memory control unit and the like. Such processors were capable of executing a single thread of a program at a time. Operating systems were developed that could time-share a processor by dispatching a program to be executed on the processor for a period of time, and then dispatching another program to be executed on the processor for another period of time. As technology evolved, memory subsystem caches were often added to the processor as well as complex dynamic address translation including translation lookaside buffers (TLBs). The IPU itself was often referred to as a processor. As technology continued to evolve, an entire processor, could be packaged as a single semiconductor chip or die, such a processor was referred to as a microprocessor. Then processors were developed that incorporated multiple IPUs, such processors were often referred to as multi-processors. Each such processor of a multi-processor computer system (processor) may include individual or shared caches, memory interfaces, system bus, address translation mechanism and the like. Virtual machine and instruction set architecture (ISA) emulators added a layer of software to a processor, that provided the virtual machine with multiple "virtual processors" (aka processors) by time-slice usage of a single IPU in a single hardware processor. As technology further evolved, multi-threaded processors were developed, enabling a single hardware processor having a single multi-thread IPU to provide a capability of simultaneously executing threads of different programs, thus each thread of a multi-threaded processor appeared to the operating system as a processor. As technology further evolved, it was possible to put multiple processors (each having an IPU) on a single semiconductor chip or die. These processors were referred to processor cores or just cores. Thus the terms such as processor, central processing unit, processing unit, microprocessor, core, processor core, processor thread, and thread, for example, are often used interchangeably. Aspects of embodiments herein may be practiced by any or all processors including those shown supra, without departing from the teachings herein. Wherein the term "thread" or "processor thread" is used herein, it is expected that particular advantage of the embodiment may be had in a processor thread implementation.

Transaction Execution in Intel® Based Embodiments

In "Intel® Architecture Instruction Set Extensions Programming Reference" 319433-012A, February 2012, incorporated herein by reference in its entirety, Chapter 8 teaches, in part, that multithreaded applications may take advantage of increasing numbers of CPU cores to achieve higher performance. However, the writing of multi-threaded applications requires programmers to understand and take into account data sharing among the multiple threads. Access to shared data typically requires synchronization mechanisms. These synchronization mechanisms are used to ensure that multiple threads update shared data by serializing operations that are applied to the shared data, often through the use of a critical section that is protected by a lock. Since serialization limits concurrency, programmers try to limit the overhead due to synchronization.

Intel® Transactional Synchronization Extensions (Intel® TSX) allow a processor to dynamically determine whether threads need to be serialized through lock-protected critical sections, and to perform that serialization only when required. This allows the processor to expose and exploit concurrency that is hidden in an application because of dynamically unnecessary synchronization.

With Intel TSX, programmer-specified code regions (also referred to as "transactional regions" or just "transactions") are executed transactionally. If the transactional execution completes successfully, then all memory operations performed within the transactional region will appear to have occurred instantaneously when viewed from other processors. A processor makes the memory operations of the executed transaction, performed within the transactional region, visible to other processors only when a successful commit occurs, i.e., when the transaction successfully completes execution. This process is often referred to as an atomic commit.

Intel TSX provides two software interfaces to specify regions of code for transactional execution. Hardware Lock Elision (HLE) is a legacy compatible instruction set extension (comprising the XACQUIRE and XRELEASE prefixes) to specify transactional regions. Restricted Transactional Memory (RTM) is a new instruction set interface (comprising the XBEGIN, XEND, and XABORT instructions) for programmers to define transactional regions in a more flexible manner than that possible with HLE. HLE is for programmers who prefer the backward compatibility of the conventional mutual exclusion programming model and would like to run HLE-enabled software on legacy hardware but would also like to take advantage of the new lock elision capabilities on hardware with HLE support. RTM is for programmers who prefer a flexible interface to the transactional execution hardware. In addition, Intel TSX also provides an XTEST instruction. This instruction allows software to query whether the logical processor is transactionally executing in a transactional region identified by either HLE or RTM.

Since a successful transactional execution ensures an atomic commit, the processor executes the code region optimistically without explicit synchronization. If synchronization was unnecessary for that specific execution, execution can commit without any cross-thread serialization. If the processor cannot commit atomically, then the optimistic execution fails. When this happens, the processor will roll back the execution, a process referred to as a transactional abort. On a transactional abort, the processor will discard all updates performed in the memory region used by the transaction, restore architectural state to appear as if the optimistic execution never occurred, and resume execution non-transactionally.

A processor can perform a transactional abort for numerous reasons. A primary reason to abort a transaction is due to conflicting memory accesses between the transactionally executing logical processor and another logical processor.

Such conflicting memory accesses may prevent a successful transactional execution. Memory addresses read from within a transactional region constitute the read-set of the transactional region and addresses written to within the transactional region constitute the write-set of the transactional region. Intel TSX maintains the read- and write-sets at the granularity of a cache line. A conflicting memory access occurs if another logical processor either reads a location that is part of the transactional region's write-set or writes a location that is a part of either the read- or write-set of the transactional region. A conflicting access typically means that serialization is required for this code region. Since Intel TSX detects data conflicts at the granularity of a cache line, unrelated data locations placed in the same cache line will be detected as conflicts that result in transactional aborts. Transactional aborts may also occur due to limited transactional resources. For example, the amount of data accessed in the region may exceed an implementation-specific capacity. Additionally, some instructions and system events may cause transactional aborts. Frequent transactional aborts result in wasted cycles and increased inefficiency.

Hardware Lock Elision

Hardware Lock Elision (HLE) provides a legacy compatible instruction set interface for programmers to use transactional execution. HLE provides two new instruction prefix hints: XACQUIRE and XRELEASE.

With HLE, a programmer adds the XACQUIRE prefix to the front of the instruction that is used to acquire the lock that is protecting the critical section. The processor treats the prefix as a hint to elide the write associated with the lock acquire operation. Even though the lock acquire has an associated write operation to the lock, the processor does not add the address of the lock to the transactional region's write-set nor does it issue any write requests to the lock. Instead, the address of the lock is added to the read-set. The logical processor enters transactional execution. If the lock was available before the XACQUIRE prefixed instruction, then all other processors will continue to see the lock as available afterwards. Since the transactionally executing logical processor neither added the address of the lock to its write-set nor performed externally visible write operations to the lock, other logical processors can read the lock without causing a data conflict. This allows other logical processors to also enter and concurrently execute the critical section protected by the lock. The processor automatically detects any data conflicts that occur during the transactional execution and will perform a transactional abort if necessary.

Even though the eliding processor did not perform any external write operations to the lock, the hardware ensures program order of operations on the lock. If the eliding processor itself reads the value of the lock in the critical section, it will appear as if the processor had acquired the lock, i.e. the read will return the non-elided value. This behavior allows an HLE execution to be functionally equivalent to an execution without the HLE prefixes.

An XRELEASE prefix can be added in front of an instruction that is used to release the lock protecting a critical section. Releasing the lock involves a write to the lock. If the instruction is to restore the value of the lock to the value the lock had prior to the XACQUIRE prefixed lock acquire operation on the same lock, then the processor elides the external write request associated with the release of the lock and does not add the address of the lock to the write-set. The processor then attempts to commit the transactional execution.

With HLE, if multiple threads execute critical sections protected by the same lock but they do not perform any conflicting operations on each other's data, then the threads can execute concurrently and without serialization. Even though the software uses lock acquisition operations on a common lock, the hardware recognizes this, elides the lock, and executes the critical sections on the two threads without requiring any communication through the lock—if such communication was dynamically unnecessary.

If the processor is unable to execute the region transactionally, then the processor will execute the region non-transactionally and without elision. HLE enabled software has the same forward progress guarantees as the underlying non-HLE lock-based execution. For successful HLE execution, the lock and the critical section code must follow certain guidelines. These guidelines only affect performance; and failure to follow these guidelines will not result in a functional failure. Hardware without HLE support will ignore the XACQUIRE and XRELEASE prefix hints and will not perform any elision since these prefixes correspond to the REPNE/REPE IA-32 prefixes which are ignored on the instructions where XACQUIRE and XRELEASE are valid. Importantly, HLE is compatible with the existing lock-based programming model. Improper use of hints will not cause functional bugs though it may expose latent bugs already in the code.

Restricted Transactional Memory (RTM) provides a flexible software interface for transactional execution. RTM provides three new instructions—XBEGIN, XEND, and XABORT—for programmers to start, commit, and abort a transactional execution.

The programmer uses the XBEGIN instruction to specify the start of a transactional code region and the XEND instruction to specify the end of the transactional code region. If the RTM region could not be successfully executed transactionally, then the XBEGIN instruction takes an operand that provides a relative offset to the fallback instruction address.

A processor may abort RTM transactional execution for many reasons. In many instances, the hardware automatically detects transactional abort conditions and restarts execution from the fallback instruction address with the architectural state corresponding to that present at the start of the XBEGIN instruction and the EAX register updated to describe the abort status.

The XABORT instruction allows programmers to abort the execution of an RTM region explicitly. The XABORT instruction takes an 8-bit immediate argument that is loaded into the EAX register and will thus be available to software following an RTM abort. RTM instructions do not have any data memory location associated with them. While the hardware provides no guarantees as to whether an RTM region will ever successfully commit transactionally, most transactions that follow the recommended guidelines are expected to successfully commit transactionally. However, programmers must always provide an alternative code sequence in the fallback path to guarantee forward progress. This may be as simple as acquiring a lock and executing the specified code region non-transactionally. Further, a transaction that always aborts on a given implementation may complete transactionally on a future implementation. Therefore, programmers must ensure the code paths for the transactional region and the alternative code sequence are functionally tested.

Detection of HLE Support

A processor supports HLE execution if CPUID.07H.EBX.HLE [bit 4]=1. However, an application can use the HLE prefixes (XACQUIRE and XRELEASE) without checking whether the processor supports HLE.

Processors without HLE support ignore these prefixes and will execute the code without entering transactional execution.

Detection of RTM Support

A processor supports RTM execution if CPUID.07H.EBX.RTM [bit 11]=1. An application must check if the processor supports RTM before it uses the RTM instructions (XBEGIN, XEND, XABORT). These instructions will generate a #UD exception when used on a processor that does not support RTM.

Detection of XTEST Instruction

A processor supports the XTEST instruction if it supports either HLE or RTM. An application must check either of these feature flags before using the XTEST instruction. This instruction will generate a #UD exception when used on a processor that does not support either HLE or RTM.

Querying Transactional Execution Status

The XTEST instruction can be used to determine the transactional status of a transactional region specified by HLE or RTM. Note, while the HLE prefixes are ignored on processors that do not support HLE, the XTEST instruction will generate a #UD exception when used on processors that do not support either HLE or RTM.

Requirements for HLE Locks

For HLE execution to successfully commit transactionally, the lock must satisfy certain properties and access to the lock must follow certain guidelines.

An XRELEASE prefixed instruction must restore the value of the elided lock to the value it had before the lock acquisition. This allows hardware to safely elide locks by not adding them to the write-set. The data size and data address of the lock release (XRELEASE prefixed) instruction must match that of the lock acquire (XACQUIRE prefixed) and the lock must not cross a cache line boundary.

Software should not write to the elided lock inside a transactional HLE region with any instruction other than an XRELEASE prefixed instruction, otherwise such a write may cause a transactional abort. In addition, recursive locks (where a thread acquires the same lock multiple times without first releasing the lock) may also cause a transactional abort. Note that software can observe the result of the elided lock acquire inside the critical section. Such a read operation will return the value of the write to the lock.

The processor automatically detects violations to these guidelines, and safely transitions to a non-transactional execution without elision. Since Intel TSX detects conflicts at the granularity of a cache line, writes to data collocated on the same cache line as the elided lock may be detected as data conflicts by other logical processors eliding the same lock.

Transactional Nesting

Both HLE and RTM support nested transactional regions. However, a transactional abort restores state to the operation that started transactional execution: either the outermost XACQUIRE prefixed HLE eligible instruction or the outermost XBEGIN instruction. The processor treats all nested transactions as one transaction.

HLE Nesting and Elision

Programmers can nest HLE regions up to an implementation specific depth of MAX_HLE_NEST_COUNT. Each logical processor tracks the nesting count internally but this count is not available to software. An XACQUIRE prefixed HLE-eligible instruction increments the nesting count, and an XRELEASE prefixed HLE-eligible instruction decrements it. The logical processor enters transactional execution when the nesting count goes from zero to one. The logical processor attempts to commit only when the nesting count becomes zero. A transactional abort may occur if the nesting count exceeds MAX_HLE_NEST_COUNT.

In addition to supporting nested HLE regions, the processor can also elide multiple nested locks. The processor tracks a lock for elision beginning with the XACQUIRE prefixed HLE eligible instruction for that lock and ending with the XRELEASE prefixed HLE eligible instruction for that same lock. The processor can, at any one time, track up to a MAX_HLE_ELIDED_LOCKS number of locks. For example, if the implementation supports a MAX_HLE_ELIDED_LOCKS value of two and if the programmer nests three HLE identified critical sections (by performing XACQUIRE prefixed HLE eligible instructions on three distinct locks without performing an intervening XRELEASE prefixed HLE eligible instruction on any one of the locks), then the first two locks will be elided, but the third won't be elided (but will be added to the transaction's writeset). However, the execution will still continue transactionally. Once an XRELEASE for one of the two elided locks is encountered, a subsequent lock acquired through the XACQUIRE prefixed HLE eligible instruction will be elided.

The processor attempts to commit the HLE execution when all elided XACQUIRE and XRELEASE pairs have been matched, the nesting count goes to zero, and the locks have satisfied requirements. If execution cannot commit atomically, then execution transitions to a non-transactional execution without elision as if the first instruction did not have an XACQUIRE prefix.

RTM Nesting

Programmers can nest RTM regions up to an implementation specific MAX_RTM_NEST_COUNT. The logical processor tracks the nesting count internally but this count is not available to software. An XBEGIN instruction increments the nesting count, and an XEND instruction decrements the nesting count. The logical processor attempts to commit only if the nesting count becomes zero. A transactional abort occurs if the nesting count exceeds MAX_RTM_NEST_COUNT.

Nesting HLE and RTM

HLE and RTM provide two alternative software interfaces to a common transactional execution capability. Transactional processing behavior is implementation specific when HLE and RTM are nested together, e.g., HLE is inside RTM or RTM is inside HLE. However, in all cases, the implementation will maintain HLE and RTM semantics. An implementation may choose to ignore HLE hints when used inside RTM regions, and may cause a transactional abort when RTM instructions are used inside HLE regions. In the latter case, the transition from transactional to non-transactional execution occurs seamlessly since the processor will re-execute the HLE region without actually doing elision, and then execute the RTM instructions.

Abort Status Definition

RTM uses the EAX register to communicate abort status to software. Following an RTM abort the EAX register has the following definition.

TABLE 1

RTM Abort Status Definition

| EAX Register Bit Position | Meaning |
|---|---|
| 0 | Set if abort caused by XABORT instruction |
| 1 | If set, the transaction may succeed on retry, this bit is always clear if bit 0 is set |
| 2 | Set if another logical processor conflicted with a memory |

TABLE 1-continued

RTM Abort Status Definition

| EAX Register Bit Position | Meaning |
|---|---|
| | address that was part of the transaction that aborted |
| 3 | Set if an internal buffer overflowed |
| 4 | Set if a debug breakpoint was hit |
| 5 | Set if an abort occurred during execution of a nested transaction |
| 23:6 | Reserved |
| 31-24 | XABORT argument (only valid if bit 0 set, otherwise reserved) |

The EAX abort status for RTM only provides causes for aborts. It does not by itself encode whether an abort or commit occurred for the RTM region. The value of EAX can be 0 following an RTM abort. For example, a CPUID instruction when used inside an RTM region causes a transactional abort and may not satisfy the requirements for setting any of the EAX bits. This may result in an EAX value of 0.

RTM Memory Ordering

A successful RTM commit causes all memory operations in the RTM region to appear to execute atomically. A successfully committed RTM region consisting of an XBEGIN followed by an XEND, even with no memory operations in the RTM region, has the same ordering semantics as a LOCK prefixed instruction.

The XBEGIN instruction does not have fencing semantics. However, if an RTM execution aborts, then all memory updates from within the RTM region are discarded and are not made visible to any other logical processor.

RTM-Enabled Debugger Support

By default, any debug exception inside an RTM region will cause a transactional abort and will redirect control flow to the fallback instruction address with architectural state recovered and bit 4 in EAX set. However, to allow software debuggers to intercept execution on debug exceptions, the RTM architecture provides additional capability.

If bit 11 of DR7 and bit 15 of the IA32_DEBUGCTL_MSR are both 1, any RTM abort due to a debug exception (#DB) or breakpoint exception (#BP) causes execution to roll back and restart from the XBEGIN instruction instead of the fallback address. In this scenario, the EAX register will also be restored back to the point of the XBEGIN instruction.

Programming Considerations

Typical programmer-identified regions are expected to transactionally execute and commit successfully. However, Intel TSX does not provide any such guarantee. A transactional execution may abort for many reasons. To take full advantage of the transactional capabilities, programmers should follow certain guidelines to increase the probability of their transactional execution committing successfully.

This section discusses various events that may cause transactional aborts. The architecture ensures that updates performed within a transaction that subsequently aborts execution will never become visible. Only committed transactional executions initiate an update to the architectural state. Transactional aborts never cause functional failures and only affect performance.

Instruction Based Considerations

Programmers can use any instruction safely inside a transaction (HLE or RTM) and can use transactions at any privilege level. However, some instructions will always abort the transactional execution and cause execution to seamlessly and safely transition to a non-transactional path.

Intel TSX allows for most common instructions to be used inside transactions without causing aborts. The following operations inside a transaction do not typically cause an abort:

Operations on the instruction pointer register, general purpose registers (GPRs) and the status flags (CF, OF, SF, PF, AF, and ZF); and Operations on XMM and YMM registers and the MXCSR register.

However, programmers must be careful when intermixing SSE and AVX operations inside a transactional region. Intermixing SSE instructions accessing XMM registers and AVX instructions accessing YMM registers may cause transactions to abort. Programmers may use REP/REPNE prefixed string operations inside transactions. However, long strings may cause aborts. Further, the use of CLD and STD instructions may cause aborts if they change the value of the DF flag. However, if DF is 1, the STD instruction will not cause an abort. Similarly, if DF is 0, then the CLD instruction will not cause an abort.

Instructions not enumerated here as causing abort when used inside a transaction will typically not cause a transaction to abort (examples include but are not limited to MFLNCE, LFLNCE, SFENCE, RDTSC, RDTSCP, etc.).

The following instructions will abort transactional execution on any implementation:

XABORT
CPUID
PAUSE

In addition, in some implementations, the following instructions may always cause transactional aborts. These instructions are not expected to be commonly used inside typical transactional regions. However, programmers must not rely on these instructions to force a transactional abort, since whether they cause transactional aborts is implementation dependent.

Operations on X87 and MMX architecture state. This includes all MMX and X87 instructions, including the FXRSTOR and FXSAVE instructions.

Update to non-status portion of EFLAGS: CLI, STI, POPFD, POPFQ, CLTS.

Instructions that update segment registers, debug registers and/or control registers: MOV to DS/ES/FS/GS/SS, POP DS/ES/FS/GS/SS, LDS, LES, LFS, LGS, LSS, SWAPGS, WRFSBASE, WRGSBASE, LGDT, SGDT, LIDT, SIDT, LLDT, SLDT, LTR, STR, Far CALL, Far JMP, Far RET, IRET, MOV to DRx, MOV to CR0/CR2/CR3/CR4/CR8 and LMSW.

Ring transitions: SYSENTER, SYSCALL, SYSEXIT, and SYSRET.

TLB and Cacheability control: CLFLUSH, INVD, WBINVD, INVLPG, INVPCID, and memory instructions with a non-temporal hint (MOVNTDQA, MOVNTDQ, MOVNTI, MOVNTPD, MOVNTPS, and MOVNTQ).

Processor state save: XSAVE, XSAVEOPT, and XRSTOR.

Interrupts: INTn, INTO.

IO: IN, INS, REP INS, OUT, OUTS, REP OUTS and their variants.

VMX: VMPTRLD, VMPTRST, VMCLEAR, VMREAD, VMWRITE, VMCALL, VMLAUNCH, VMRESUME, VMXOFF, VMXON, INVEPT, and INVVPID.

SMX: GETSEC.

UD2, RSM, RDMSR, WRMSR, HLT, MONITOR, MWAIT, XSETBV, VZEROUPPER, MASKMOVQ, and V/MASKMOVDQU.

Runtime Considerations

In addition to the instruction-based considerations, runtime events may cause transactional execution to abort. These may be due to data access patterns or micro-architectural implementation features. The following list is not a comprehensive discussion of all abort causes.

Any fault or trap in a transaction that must be exposed to software will be suppressed. Transactional execution will abort and execution will transition to a non-transactional execution, as if the fault or trap had never occurred. If an exception is not masked, then that un-masked exception will result in a transactional abort and the state will appear as if the exception had never occurred.

Synchronous exception events (#DE, #OF, #NP, #SS, #GP, #BR, #UD, #AC, #XF, #PF, #NM, #TS, #MF, #DB, #BP/INT3) that occur during transactional execution may cause an execution not to commit transactionally, and require a non-transactional execution. These events are suppressed as if they had never occurred. With HLE, since the non-transactional code path is identical to the transactional code path, these events will typically re-appear when the instruction that caused the exception is re-executed non-transactionally, causing the associated synchronous events to be delivered appropriately in the non-transactional execution. Asynchronous events (NMI, SMI, INTR, IPI, PMI, etc.) occurring during transactional execution may cause the transactional execution to abort and transition to a non-transactional execution. The asynchronous events will be pended and handled after the transactional abort is processed.

Transactions only support write-back cacheable memory type operations. A transaction may always abort if the transaction includes operations on any other memory type. This includes instruction fetches to UC memory type.

Memory accesses within a transactional region may require the processor to set the Accessed and Dirty flags of the referenced page table entry. The behavior of how the processor handles this is implementation specific. Some implementations may allow the updates to these flags to become externally visible even if the transactional region subsequently aborts. Some Intel TSX implementations may choose to abort the transactional execution if these flags need to be updated. Further, a processor's page-table walk may generate accesses to its own transactionally written but uncommitted state. Some Intel TSX implementations may choose to abort the execution of a transactional region in such situations. Regardless, the architecture ensures that, if the transactional region aborts, then the transactionally written state will not be made architecturally visible through the behavior of structures such as TLBs.

Executing self-modifying code transactionally may also cause transactional aborts. Programmers must continue to follow the Intel recommended guidelines for writing self-modifying and cross-modifying code even when employing HLE and RTM. While an implementation of RTM and HLE will typically provide sufficient resources for executing common transactional regions, implementation constraints and excessive sizes for transactional regions may cause a transactional execution to abort and transition to a non-transactional execution. The architecture provides no guarantee of the amount of resources available to do transactional execution and does not guarantee that a transactional execution will ever succeed.

Conflicting requests to a cache line accessed within a transactional region may prevent the transaction from executing successfully. For example, if logical processor PO reads line A in a transactional region and another logical processor PI writes line A (either inside or outside a transactional region) then logical processor PO may abort if logical processor PI's write interferes with processor PO's ability to execute transactionally.

Similarly, if PO writes line A in a transactional region and PI reads or writes line A (either inside or outside a transactional region), then PO may abort if PI's access to line A interferes with PO's ability to execute transactionally. In addition, other coherence traffic may at times appear as conflicting requests and may cause aborts. While these false conflicts may happen, they are expected to be uncommon. The conflict resolution policy to determine whether PO or PI aborts in the above scenarios is implementation specific.

Generic Transaction Execution Embodiments:

According to "ARCHITECTURES FOR TRANSACTIONAL MEMORY", a dissertation submitted to the Department of Computer Science and the Committee on Graduate Studies of Stanford University in partial fulfillment of the requirements for the Degree of Doctor of Philosophy, by Austen McDonald, June 2009, incorporated by reference herein in its entirety, fundamentally, there are three mechanisms needed to implement an atomic and isolated transactional region: versioning, conflict detection, and contention management.

To make a transactional code region appear atomic, all the modifications performed by that transactional code region must be stored and kept isolated from other transactions until commit time. The system does this by implementing a versioning policy. Two versioning paradigms exist: eager and lazy. An eager versioning system stores newly generated transactional values in place and stores previous memory values on the side, in what is called an undo-log. A lazy versioning system stores new values temporarily in what is called a write buffer, copying them to memory only on commit. In either system, the cache is used to optimize storage of new versions.

To ensure serializability between transactions, conflicts must be detected and resolved. The two systems, i.e., the eager and lazy versioning systems, detect conflicts by implementing a conflict detection policy, either optimistic or pessimistic. An optimistic system executes transactions in parallel, checking for conflicts only when a transaction commits A pessimistic system checks for conflicts at each load and store. Similar to versioning, conflict detection also uses the cache, marking each line as either part of the read-set, part of the write-set, or both. The two systems resolve conflicts by implementing a contention management policy. Many contention management policies exist, some are more appropriate for optimistic conflict detection and some are more appropriate for pessimistic. Described below are some example policies.

Since each transactional memory (TM) system needs both versioning detection and conflict detection, these options give rise to four distinct TM designs: Eager-Pessimistic (EP), Eager-Optimistic (EO), Lazy-Pessimistic (LP), and Lazy-Optimistic (LO). Table 2 briefly describes all four distinct TM designs.

Figure 1:
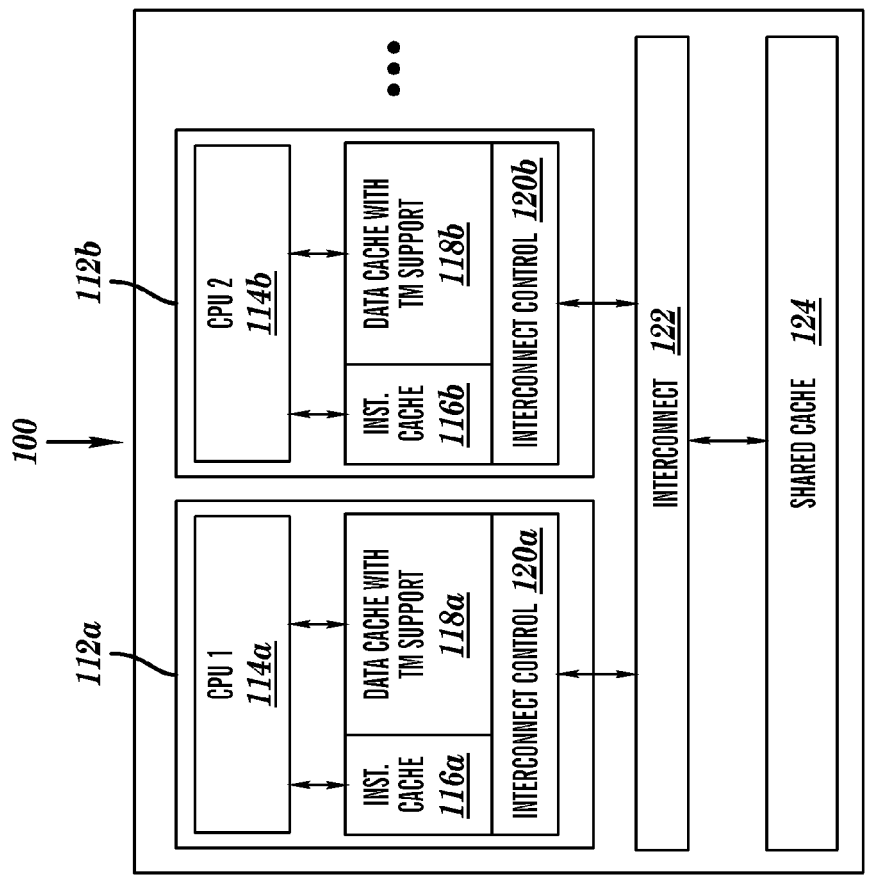

FIGS. 1 and 2 depict an example of a multicore TM environment. FIG. 1 shows many TM-enabled CPUs (CPU1 114*a*, CPU2 114*b*, etc.) on one die 100, connected with an interconnect 122, under management of an interconnect control 120*a*, 120*b*. Each CPU 114*a*, 114*b* (also known as a Processor) may have a split cache consisting of an Instruction Cache 116a, 116b for caching instructions from memory to be executed and a Data Cache 118a, 118b with TM support for caching data (operands) of memory locations to be operated on by CPU 114a, 114b (in FIG. 1, each CPU 114a, 114b and its associated caches are referenced as 112a, 112b). In an implementation, caches of multiple dies 100 are interconnected to support cache coherency between the caches of the multiple dies 100. In an implementation, a single cache, rather than the split cache is employed holding both instructions and data. In implementations, the CPU caches are one level of caching in a hierarchical cache structure. For example each die 100 may employ a shared cache 124 to be shared amongst all the CPUs on the die 100. In another implementation, each die may have access to a shared cache 124, shared amongst all the processors of all the dies 100.

FIG. 2 shows the details of an example transactional CPU environment 112, having a CPU 114, including additions to support TM. The transactional CPU (processor) 114 may include hardware for supporting Register Checkpoints 126 and special TM Registers 128. The transactional CPU cache may have the MESI bits 130, Tags 140 and Data 142 of a conventional cache but also, for example, R bits 132 showing a line has been read by the CPU 114 while executing a transaction and W bits 138 showing a line has been written-to by the CPU 114 while executing a transaction.

A key detail for programmers in any TM system is how non-transactional accesses interact with transactions. By design, transactional accesses are screened from each other using the mechanisms above. However, the interaction between a regular, non-transactional load with a transaction containing a new value for that address must still be considered. In addition, the interaction between a non-transactional store with a transaction that has read that address must also be explored. These are issues of the database concept isolation.

A TM system is said to implement strong isolation, sometimes called strong atomicity, when every non-transactional load and store acts like an atomic transaction. Therefore, non-transactional loads cannot see uncommitted data and non-transactional stores cause atomicity violations in any transactions that have read that address. A system where this is not the case is said to implement weak isolation, sometimes called weak atomicity.

Strong isolation is often more desirable than weak isolation due to the relative ease of conceptualization and implementation of strong isolation. Additionally, if a programmer has forgotten to surround some shared memory references with transactions, causing bugs, then with strong isolation, the programmer will often detect that oversight using a simple debug interface because the programmer will see a non-transactional region causing atomicity violations. Also, programs written in one model may work differently on another model.

Further, strong isolation is often easier to support in hardware TM than weak isolation. With strong isolation, since the coherence protocol already manages load and store communication between processors, transactions can detect non-transactional loads and stores and act appropriately. To implement strong isolation in software Transactional Memory (TM), non-transactional code must be modified to include read- and write-barriers; potentially crippling performance. Although great effort has been expended to remove many un-needed barriers, such techniques are often complex and performance is typically far lower than that of HTMs.

TABLE 2

Transactional Memory Design Space

| | | VERSIONING | |
|---|---|---|---|
| | | Lazy | Eager |
| CONFLICT DETECTION | Optimistic | Storing updates in a write buffer; detecting conflicts at commit time. | Not practical: waiting to update memory until commit time but detecting conflicts at access time guarantees wasted work and provides no advantage |
| | Pessimistic | Storing updates in a write buffer; detecting conflicts at access time. | Updating memory, keeping old values in undo log; detecting conflicts at access time. |

Table 2 illustrates the fundamental design space of transactional memory (versioning and conflict detection).

Eager-Pessimistic (EP)

This first TM design described below is known as Eager-Pessimistic. An EP system stores its write-set "in place" (hence the name "eager") and, to support rollback, stores the old values of overwritten lines in an "undo log". Processors use the W 138 and R 132 cache bits to track read and write-sets and detect conflicts when receiving snooped load requests. Perhaps the most notable examples of EP systems in known literature are Log# and UTM.

Beginning a transaction in an EP system is much like beginning a transaction in other systems: tm_begin( ) takes a register checkpoint, and initializes any status registers. An EP system also requires initializing the undo log, the details of which are dependent on the log format, but often involve initializing a log base pointer to a region of pre-allocated, thread-private memory, and clearing a log bounds register.

Versioning: In EP, due to the way eager versioning is designed to function, the MESI 130 state transitions (cache line indicators corresponding to Modified, Exclusive, Shared, and Invalid code states) are left mostly unchanged. Outside of a transaction, the MESI 130 state transitions are left completely unchanged. When reading a line inside a transaction, the standard coherence transitions apply (S (Shared)→S, I (Invalid)→S, or I→E (Exclusive)), issuing a load miss as needed, but the R 132 bit is also set. Likewise, writing a line applies the standard transitions (S→M, E I→M), issuing a miss as needed, but also sets the W 138 (Written) bit. The first time a line is written, the old version of the entire line is loaded then written to the undo log to preserve it in case the current transaction aborts. The newly written data is then stored "in-place," over the old data.

Conflict Detection: Pessimistic conflict detection uses coherence messages exchanged on misses, or upgrades, to look for conflicts between transactions. When a read miss occurs within a transaction, other processors receive a load request; but they ignore the request if they do not have the needed line. If the other processors have the needed line non-speculatively or have the line R 132 (Read), they downgrade that line to S, and in certain cases issue a cache-to-cache transfer if they have the line in MESI's 130 M or E state. However, if the cache has the line W 138, then a conflict is detected between the two transactions and additional action(s) must be taken.

Similarly, when a transaction seeks to upgrade a line from shared to modified (on a first write), the transaction issues an exclusive load request, which is also used to detect conflicts. If a receiving cache has the line non-speculatively, then the line is invalidated, and in certain cases a cache-to-cache transfer (M or E states) is issued. But, if the line is R 132 or W 138, a conflict is detected.

Validation: Because conflict detection is performed on every load, a transaction always has exclusive access to its own write-set. Therefore, validation does not require any additional work.

Commit Since eager versioning stores the new version of data items in place, the commit process simply clears the W 138 and R 132 bits and discards the undo log.

Abort: When a transaction rolls back, the original version of each cache line in the undo log must be restored, a process called "unrolling" or "applying" the log. This is done during tm_discard( ) and must be atomic with regard to other transactions. Specifically, the write-set must still be used to detect conflicts: this transaction has the only correct version of lines in its undo log, and requesting transactions must wait for the correct version to be restored from that log. Such a log can be applied using a hardware state machine or software abort handler.

Eager-Pessimistic has the characteristics of: Commit is simple and since it is in-place, very fast. Similarly, validation is a no-op. Pessimistic conflict detection detects conflicts early, thereby reducing the number of "doomed" transactions. For example, if two transactions are involved in a Write-After-Read dependency, then that dependency is detected immediately in pessimistic conflict detection. However, in optimistic conflict detection such conflicts are not detected until the writer commits.

Eager-Pessimistic also has the characteristics of: As described above, the first time a cache line is written, the old value must be written to the log, incurring extra cache accesses. Aborts are expensive as they require undoing the log. For each cache line in the log, a load must be issued, perhaps going as far as main memory before continuing to the next line. Pessimistic conflict detection also prevents certain serializable schedules from existing.

Additionally, because conflicts are handled as they occur, there is a potential for livelock and careful contention management mechanisms must be employed to guarantee forward progress.

Lazy-Optimistic (LO)

Another popular TM design is Lazy-Optimistic (LO), which stores its write-set in a "write buffer" or "redo log" and detects conflicts at commit time (still using the R 132 and W 138 bits).

Versioning: Just as in the EP system, the MESI protocol of the LO design is enforced outside of the transactions. Once inside a transaction, reading a line incurs the standard MESI transitions but also sets the R 132 bit. Likewise, writing a line sets the W 138 bit of the line, but handling the MESI transitions of the LO design is different from that of the EP design. First, with lazy versioning, the new versions of written data are stored in the cache hierarchy until commit while other transactions have access to old versions available in memory or other caches. To make available the old versions, dirty lines (M lines) must be evicted when first written by a transaction. Second, no upgrade misses are needed because of the optimistic conflict detection feature: if a transaction has a line in the S state, it can simply write to it and upgrade that line to an M state without communicating the changes with other transactions because conflict detection is done at commit time.

Conflict Detection and Validation: To validate a transaction and detect conflicts, LO communicates the addresses of speculatively modified lines to other transactions only when it is preparing to commit. On validation, the processor sends one, potentially large, network packet containing all the addresses in the write-set. Data is not sent, but left in the cache of the committer and marked dirty (M). To build this packet without searching the cache for lines marked W, a simple bit vector is used, called a "store buffer," with one bit per cache line to track these speculatively modified lines. Other transactions use this address packet to detect conflicts: if an address is found in the cache and the R 132 and/or W 138 bits are set, then a conflict is initiated. If the line is found but neither R 132 nor W 138 is set, then the line is simply invalidated, which is similar to processing an exclusive load.

To support transaction atomicity, these address packets must be handled atomically, i.e., no two address packets may exist at once with the same addresses. In an LO system, this can be achieved by simply acquiring a global commit token before sending the address packet. However, a two-phase commit scheme could be employed by first sending out the address packet, collecting responses, enforcing an ordering protocol (perhaps oldest transaction first), and committing once all responses are satisfactory.

Commit Once validation has occurred, commit needs no special treatment: simply clear W 138 and R 132 bits and the store buffer. The transaction's writes are already marked dirty in the cache and other caches' copies of these lines have been invalidated via the address packet. Other processors can then access the committed data through the regular coherence protocol.

Abort: Rollback is equally easy: because the write-set is contained within the local caches, these lines can be invalidated, then clear W 138 and R 132 bits and the store buffer. The store buffer allows W lines to be found to invalidate without the need to search the cache.

Lazy-Optimistic has the characteristics of: Aborts are very fast, requiring no additional loads or stores and making only local changes. More serializable schedules can exist than found in EP, which allows an LO system to more aggressively speculate that transactions are independent, which can yield higher performance Finally, the late detection of conflicts can increase the likelihood of forward progress.

Lazy-Optimistic also has the characteristics of: Validation takes global communication time proportional to size of write set. Doomed transactions can waste work since conflicts are detected only at commit time.

Lazy-Pessimistic (LP)

Lazy-Pessimistic (LP) represents a third TM design option, sitting somewhere between EP and LO: storing newly written lines in a write buffer but detecting conflicts on a per access basis.

Versioning: Versioning is similar but not identical to that of LO: reading a line sets its R bit 132, writing a line sets its W bit 138, and a store buffer is used to track W lines in the cache. Also, dirty (M) lines must be evicted when first written by a transaction, just as in LO. However, since conflict detection is pessimistic, load exclusives must be performed when upgrading a transactional line from I, S→M, which is unlike LO.

Conflict Detection: LP's conflict detection operates the same as EP's: using coherence messages to look for conflicts between transactions.

Validation: Like in EP, pessimistic conflict detection ensures that at any point, a running transaction has no conflicts with any other running transaction, so validation is a no-op.

Commit: Commit needs no special treatment: simply clear W 138 and R 132 bits and the store buffer, like in LO.

Abort: Rollback is also like that of LO: simply invalidate the write-set using the store buffer and clear the W and R bits and the store buffer.

Eager-Optimistic (EO)

The LP has the characteristics of: Like LO, aborts are very fast. Like EP, the use of pessimistic conflict detection reduces the number of "doomed" transactions. Like EP, some serializable schedules are not allowed and conflict detection must be performed on each cache miss.

The final combination of versioning and conflict detection is Eager-Optimistic (EO). EO may be a less than optimal choice for HTM systems: since new transactional versions are written in-place, other transactions have no choice but to notice conflicts as they occur (i.e., as cache misses occur). But since EO waits until commit time to detect conflicts, those transactions become "zombies," continuing to execute, wasting resources, yet are "doomed" to abort.

EO has proven to be useful in STMs and is implemented by Bartok-STM and McRT. A lazy versioning STM needs to check its write buffer on each read to ensure that it is reading the most recent value. Since the write buffer is not a hardware structure, this is expensive, hence the preference for write-in-place eager versioning. Additionally, since checking for conflicts is also expensive in an STM, optimistic conflict detection offers the advantage of performing this operation in bulk.

Contention Management

How a transaction rolls back once the system has decided to abort that transaction has been described above, but, since a conflict involves two transactions, the topics of which transaction should abort, how that abort should be initiated, and when should the aborted transaction be retried need to be explored. These are topics that are addressed by Contention Management (CM), a key component of transactional memory. Described below are policies regarding how the systems initiate aborts and the various established methods of managing which transactions should abort in a conflict.

Contention Management Policies

A Contention Management (CM) Policy is a mechanism that determines which transaction involved in a conflict should abort and when the aborted transaction should be retried. For example, it is often the case that retrying an aborted transaction immediately does not lead to the best performance. Conversely, employing a back-off mechanism, which delays the retrying of an aborted transaction, can yield better performance. STMs first grappled with finding the best contention management policies and many of the policies outlined below were originally developed for STMs.

CM Policies draw on a number of measures to make decisions, including ages of the transactions, size of read- and write-sets, the number of previous aborts, etc. The combinations of measures to make such decisions are endless, but certain combinations are described below, roughly in order of increasing complexity.

To establish some nomenclature, first note that in a conflict there are two sides: the attacker and the defender. The attacker is the transaction requesting access to a shared memory location. In pessimistic conflict detection, the attacker is the transaction issuing the load or load exclusive. In optimistic, the attacker is the transaction attempting to validate. The defender in both cases is the transaction receiving the attacker's request.

An Aggressive CM Policy immediately and always retries either the attacker or the defender. In LO, Aggressive means that the attacker always wins, and so Aggressive is sometimes called committer wins. Such a policy was used for the earliest LO systems. In the case of EP, Aggressive can be either defender wins or attacker wins.

Restarting a conflicting transaction that will immediately experience another conflict is bound to waste work—namely interconnect bandwidth refilling cache misses. A Polite CM Policy employs exponential backoff (but linear could also be used) before restarting conflicts. To prevent starvation, a situation where a process does not have resources allocated to it by the scheduler, the exponential backoff greatly increases the odds of transaction success after some n retries.

Another approach to conflict resolution is to randomly abort the attacker or defender (a policy called Randomized). Such a policy may be combined with a randomized backoff scheme to avoid unneeded contention.

However, making random choices, when selecting a transaction to abort, can result in aborting transactions that have completed "a lot of work", which can waste resources. To avoid such waste, the amount of work completed on the transaction can be taken into account when determining which transaction to abort. One measure of work could be a transaction's age. Other methods include Oldest, Bulk TM, Size Matters, Karma, and Polka. Oldest is a simple timestamp method that aborts the younger transaction in a conflict. Bulk TM uses this scheme. Size Matters is like Oldest but instead of transaction age, the number of read/written words is used as the priority, reverting to Oldest after a fixed number of aborts. Karma is similar, using the size of the write-set as priority. Rollback then proceeds after backing off a fixed amount of time. Aborted transactions keep their priorities after being aborted (hence the name Karma). Polka works like Karma but instead of backing off a pre-defined amount of time, it backs off exponentially more each time.

Since aborting wastes work, it is logical to argue that stalling an attacker until the defender has finished their transaction would lead to better performance Unfortunately, such a simple scheme easily leads to deadlock.

Deadlock avoidance techniques can be used to solve this problem. Greedy uses two rules to avoid deadlock. The first rule is, if a first transaction, T1, has lower priority than a second transaction, T0, or if T1 is waiting for another transaction, then T1 aborts when conflicting with T0. The second rule is, if T1 has higher priority than T0 and is not waiting, then T0 waits until T1 commits, aborts, or starts waiting (in which case the first rule is applied). Greedy provides some guarantees about time bounds for executing a set of transactions. One EP design (LogTM) uses a CM policy similar to Greedy to achieve stalling with conservative deadlock avoidance.

Example MESI coherency rules provide for four possible states in which a cache line of a multiprocessor cache system may reside, M, E, S, and I, defined as follows:

Modified (M): The cache line is present only in the current cache, and is dirty; it has been modified from the value in main memory. The cache is required to write the data back to main memory at some time in the future, before permitting any other read of the (no longer valid) main memory state. The write-back changes the line to the Exclusive state.

Exclusive (E): The cache line is present only in the current cache, but is clean; it matches main memory. It may be changed to the Shared state at any time, in response to a read request. Alternatively, it may be changed to the Modified state when writing to it.

Shared (S): Indicates that this cache line may be stored in other caches of the machine and is "clean"; it matches the main memory. The line may be discarded (changed to the Invalid state) at any time.

Invalid (I): Indicates that this cache line is invalid (unused).

TM coherency status indicators (R 132, W 138) may be provided for each cache line, in addition to, or encoded in the MESI coherency bits. An R 132 indicator indicates the current transaction has read from the data of the cache line, and a W 138 indicator indicates the current transaction has written to the data of the cache line.

In another aspect of TM design, a system is designed using transactional store buffers. U.S. Pat. No. 6,349,361 titled "Methods and Apparatus for Reordering and Renaming Memory References in a Multiprocessor Computer System," filed Mar. 31, 2000 and incorporated by reference herein in its entirety, teaches a method for reordering and renaming memory references in a multiprocessor computer system having at least a first and a second processor. The first processor has a first private cache and a first buffer, and the second processor has a second private cache and a second buffer. The method includes the operations of, for each of a plurality of gated store requests received by the first processor to store a datum, exclusively acquiring a cache line that contains the datum by the first private cache, and storing the datum in the first buffer. Upon the first buffer receiving a load request from the first processor to load a particular datum, the particular datum is provided to the first processor from among the data stored in the first buffer based on an in-order sequence of load and store operations. Upon the first cache receiving a load request from the second cache for a given datum, an error condition is indicated and a current state of at least one of the processors is reset to an earlier state when the load request for the given datum corresponds to the data stored in the first buffer.

The main implementation components of one such transactional memory facility are a transaction-backup register file for holding pre-transaction GR (general register) content, a cache directory to track the cache lines accessed during the transaction, a store cache to buffer stores until the transaction ends, and firmware routines to perform various complex functions. In this section a detailed implementation is described.

IBM zEnterprise EC12 Enterprise Server Embodiment

The IBM zEnterprise EC12 enterprise server introduces transactional execution (TX) in transactional memory, and is described in part in a paper, "Transactional Memory Architecture and Implementation for IBM System z" of Proceedings Pages 25-36 presented at MICRO-45, 1-5 Dec. 2012, Vancouver, British Columbia, Canada, available from IEEE Computer Society Conference Publishing Services (CPS), which is incorporated by reference herein in its entirety.

Table 3 shows an example transaction. Transactions started with TBEGIN are not assured to ever successfully complete with TEND, since they can experience an aborting condition at every attempted execution, e.g., due to repeating conflicts with other CPUs. This requires that the program support a fallback path to perform the same operation non-transactionally, e.g., by using traditional locking schemes. This puts significant burden on the programming and software verification teams, especially where the fallback path is not automatically generated by a reliable compiler.

TABLE 3

Example Transaction Code

| | LHI | R0,0 | *initialize retry count=0 |
|---|---|---|---|
| loop | TBEGIN | | *begin transaction |
| | JNZ | abort | *go to abort code if CC1=0 |
| | LT | R1, lock | *load and test the fallback lock |
| | JNZ | lckbzy | *branch if lock busy |
| | . . . perform operation . . . | | |
| | TEND | | *end transaction |
| | . . . . . . | . . . . . . | |
| lckbzy | TABORT | | *abort if lock busy; this |
| | | | *resumes after TBEGIN |
| abort | JO | fallback | *no retry if CC=3 |
| | AHI | R0, 1 | *increment retry count |
| | CIJNL | R0,6, fallback | *give up after 6 attempts |
| | PPA | R0, TX | *random delay based on retry count |
| | . . . potentially wait for lock to become free . . . | | |
| | J | loop | *jump back to retry fallback |
| | OBTAIN | lock | *using Compare&Swap |
| | . . . perform operation . . . | | |
| | RELEASE | lock | |
| | . . . . . . | . . . . . . | |

The requirement of providing a fallback path for aborted Transaction Execution (TX) transactions can be onerous. Many transactions operating on shared data structures are expected to be short, touch only a few distinct memory locations, and use simple instructions only. For those transactions, the IBM zEnterprise EC12 introduces the concept of constrained transactions; under normal conditions, the CPU 114 (FIG. 2) assures that constrained transactions eventually end successfully, albeit without giving a strict limit on the number of necessary retries. A constrained transaction starts with a TBEGINC instruction and ends with a regular TEND. Implementing a task as a constrained or non-constrained transaction typically results in very comparable performance, but constrained transactions simplify software development by removing the need for a fallback path. IBM's Transactional Execution architecture is further described in z/Architecture, Principles of Operation, Tenth Edition, SA22-7832-09 published September 2012 from IBM, incorporated by reference herein in its entirety.

A constrained transaction starts with the TBEGINC instruction. A transaction initiated with TBEGINC must follow a list of programming constraints; otherwise the program takes a non-filterable constraint-violation interruption. Exemplary constraints may include, but not be limited to: the transaction can execute a maximum of 32 instructions, all instruction text must be within 256 consecutive bytes of memory; the transaction contains only forward-pointing relative branches (i.e., no loops or subroutine calls); the transaction can access a maximum of 4 aligned octo-words (an octoword is 32 bytes) of memory; and restriction of the instruction-set to exclude complex instructions like decimal or floating-point operations. The constraints are chosen such that many common operations like doubly linked list-insert/delete operations can be performed, including the very powerful concept of atomic compare-and-swap targeting up to 4 aligned octowords. At the same time, the constraints were chosen conservatively such that future CPU implementations can assure transaction success without needing to adjust the constraints, since that would otherwise lead to software incompatibility.

TBEGINC mostly behaves like XBEGIN in TSX or TBEGIN on IBM's zEC12 servers, except that the floating-point register (FPR) control and the program interruption filtering fields do not exist and the controls are considered to be zero. On a transaction abort, the instruction address is set back directly to the TBEGINC instead of to the instruction after, reflecting the immediate retry and absence of an abort path for constrained transactions.

Nested transactions are not allowed within constrained transactions, but if a TBEGINC occurs within a non-constrained transaction it is treated as opening a new non-constrained nesting level just like TBEGIN would. This can occur, e.g., if a non-constrained transaction calls a subroutine that uses a constrained transaction internally.

Since interruption filtering is implicitly off, all exceptions during a constrained transaction lead to an interruption into the operating system (OS). Eventual successful finishing of the transaction relies on the capability of the OS to page-in the at most 4 pages touched by any constrained transaction. The OS must also ensure time-slices long enough to allow the transaction to complete.

TABLE 4

Transaction Code Example

| | |
|---|---|
| TBEGINC | *begin constrained transaction |
| ... perform operation ... | |
| TEND | *end transaction |

Table 4 shows the constrained-transactional implementation of the code in Table 3, assuming that the constrained transactions do not interact with other locking-based code. No lock testing is shown therefore, but could be added if constrained transactions and lock-based code were mixed.

When failure occurs repeatedly, software emulation is performed using millicode as part of system firmware. Advantageously, constrained transactions have desirable properties because of the burden removed from programmers.

Figure 3:
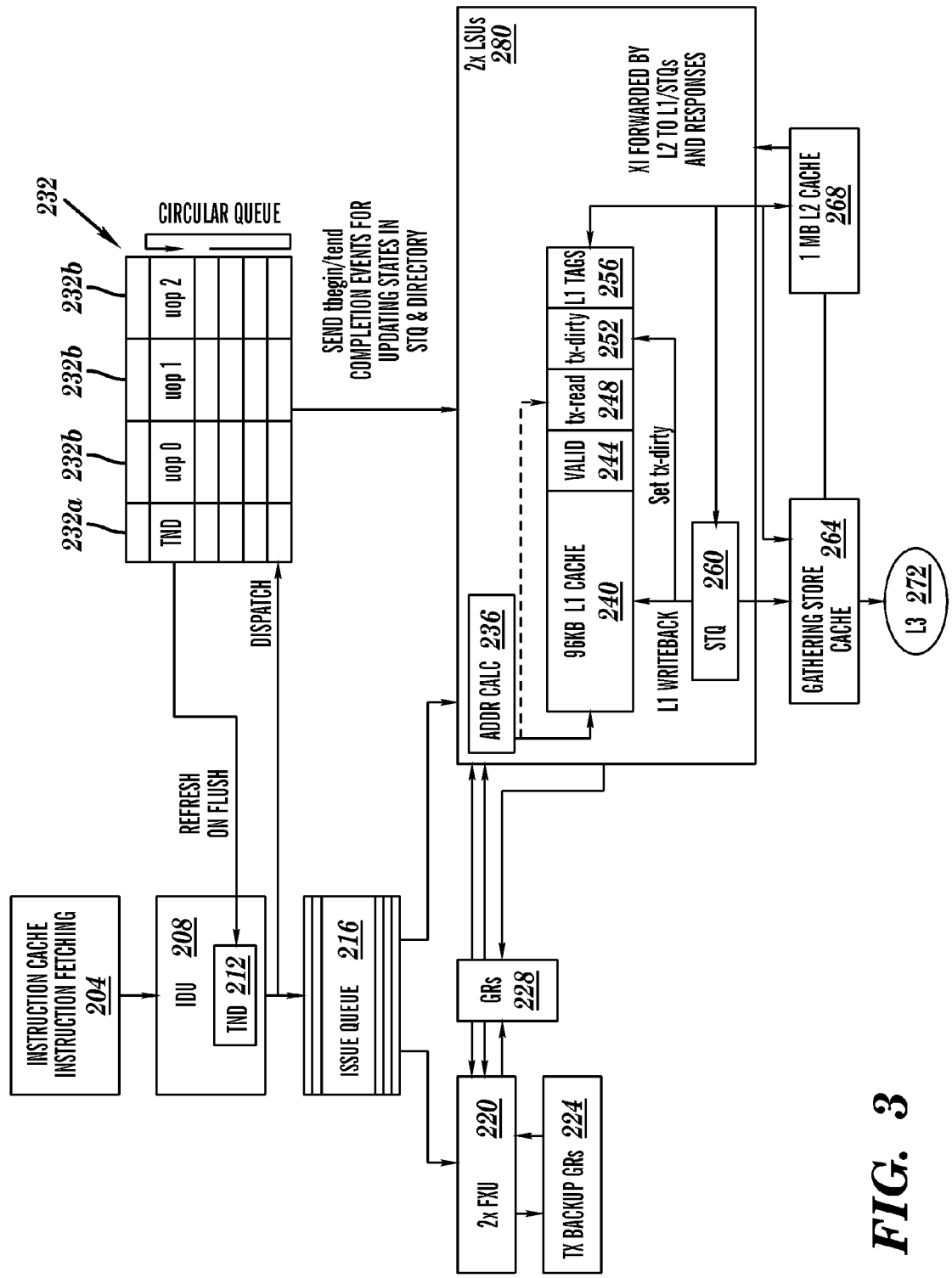
FIG. 3 depicts example components of an example CPU, in accordance with present embodiments.

With reference to FIG. 3, the IBM zEnterprise EC12 processor introduced the transactional execution facility. The processor can decode 3 instructions per clock cycle; simple instructions are dispatched as single micro-ops, and more complex instructions are cracked into multiple micro-ops. The micro-ops (Uops 232b) are written into a unified issue queue 216, from where they can be issued out-of-order. Up to two fixed-point, one floating-point, two load/store, and two branch instructions can execute every cycle. A Global Completion Table (GCT) 232 holds every micro-op 232b and a transaction nesting depth (TND) 232a. The GCT 232 is written in-order at decode time, tracks the execution status of each micro-op 232b, and completes instructions when all micro-ops 232b of the oldest instruction group have successfully executed.

The level 1 (L1) data cache 240 is a 96 KB (kilo-byte) 6-way associative cache with 256 byte cache-lines and 4 cycle use latency, coupled to a private 1 MB (mega-byte) 8-way associative 2nd-level (L2) data cache 268 with 7 cycles use-latency penalty for L1 240 misses. The L1 240 cache is the cache closest to a processor and Ln cache is a cache at the nth level of caching. Both L1 240 and L2 268 caches are store-through. Six cores on each central processor (CP) chip share a 48 MB 3rd-level store-in cache, and six CP chips are connected to an off-chip 384 MB 4th-level cache, packaged together on a glass ceramic multi-chip module (MCM). Up to 4 multi-chip modules (MCMs) can be connected to a coherent symmetric multi-processor (SMP) system with up to 144 cores (not all cores are available to run customer workload).

Coherency is managed with a variant of the MESI protocol. Cache-lines can be owned read-only (shared) or exclusive; the L1 240 and L2 268 are store-through and thus do not contain dirty lines. The L3 272 and L4 caches (not shown) are store-in and track dirty states. Each cache is inclusive of all its connected lower level caches.

Coherency requests are called "cross interrogates" (XI) and are sent hierarchically from higher level to lower-level caches, and between the L4s. When one core misses the L1 240 and L2 268 and requests the cache line from its local L3 272, the L3 272 checks whether it owns the line, and if necessary sends an XI to the currently owning L2 268/L1 240 under that L3 272 to ensure coherency, before it returns the cache line to the requestor. If the request also misses the L3 272, the L3 272 sends a request to the L4 (not shown), which enforces coherency by sending XIs to all necessary L3s under that L4, and to the neighboring L4s. Then the L4 responds to the requesting L3 which forwards the response to the L2 268/L1 240.

Note that due to the inclusivity rule of the cache hierarchy, sometimes cache lines are XI'ed from lower-level caches due to evictions on higher-level caches caused by associativity overflows from requests to other cache lines. These XIs can be called "LRU XIs", where LRU stands for least recently used.

Making reference to yet another type of XI requests, Demote-XIs transition cache-ownership from exclusive into read-only state, and Exclusive-XIs transition cache ownership from exclusive into invalid state. Demote-XIs and Exclusive-XIs need a response back to the XI sender. The target cache can "accept" the XI, or send a "reject" response if it first needs to evict dirty data before accepting the XI. The L1 240/L2 268 caches are store through, but may reject demote-XIs and exclusive XIs if they have stores in their store queues that need to be sent to L3 before downgrading the exclusive state. A rejected XI will be repeated by the sender. Read-only-XIs are sent to caches that own the line read-only; no response is needed for such XIs since they cannot be rejected. The details of the SMP protocol are similar to those described for the IBM z10 by P. Mak, C. Walters, and G. Strait, in "IBM System z10 processor cache subsystem microarchitecture", IBM Journal of Research and Development, Vol 53:1, 2009, which is incorporated by reference herein in its entirety.

Transactional Instruction Execution

FIG. 3 depicts example components of an example transactional execution environment, including a CPU and caches/components with which it interacts (such as those depicted in FIGS. 1 and 2). The instruction decode unit 208 (IDU) keeps track of the current transaction nesting depth 212 (TND). When the IDU 208 receives a TBEGIN instruction, the nesting depth 212 is incremented, and conversely decremented on TEND instructions. The nesting depth 212 is written into the GCT 232 for every dispatched instruction. When a TBEGIN or TEND is decoded on a speculative path that later gets flushed, the IDU's 208 nesting depth 212 is refreshed from the youngest GCT 232 entry that is not flushed. The transactional state is also written into the issue queue 216 for consumption by the execution units, mostly by the Load/Store Unit (LSU) 280, which also has an effective address calculator 236 is included in the LSU 280. The TBEGIN instruction may specify a transaction diagnostic block (TDB) for recording status information, should the transaction abort before reaching a TEND instruction.

Similar to the nesting depth, the IDU 208/GCT 232 collaboratively track the access register/floating-point register (AR/FPR) modification masks through the transaction nest; the IDU 208 can place an abort request into the GCT 232 when an AR/FPR-modifying instruction is decoded and the modification mask blocks that. When the instruction becomes next-to-complete, completion is blocked and the transaction aborts. Other restricted instructions are handled similarly, including TBEGIN if decoded while in a constrained transaction, or exceeding the maximum nesting depth.

An outermost TBEGIN is cracked into multiple micro-ops depending on the GR-Save-Mask; each micro-op 232*b* (including, for example uop 0, uop 1, and uop2) will be executed by one of the two fixed point units (FXUs) 220 to save a pair of GRs 228 into a special transaction-backup register file 224, that is used to later restore the GR 228 content in case of a transaction abort. Also the TBEGIN spawns micro-ops 232*b* to perform an accessibility test for the TDB if one is specified; the address is saved in a special purpose register for later usage in the abort case. At the decoding of an outermost TBEGIN, the instruction address and the instruction text of the TBEGIN are also saved in special purpose registers for a potential abort processing later on.

TEND and NTSTG are single micro-op 232*b* instructions; NTSTG (non-transactional store) is handled like a normal store except that it is marked as non-transactional in the issue queue 216 so that the LSU 280 can treat it appropriately. TEND is a no-op at execution time, the ending of the transaction is performed when TEND completes.

As mentioned, instructions that are within a transaction are marked as such in the issue queue 216, but otherwise execute mostly unchanged; the LSU 280 performs isolation tracking as described in the next section.

Since decoding is in-order, and since the IDU 208 keeps track of the current transactional state and writes it into the issue queue 216 along with every instruction from the transaction, execution of TBEGIN, TEND, and instructions before, within, and after the transaction can be performed out-of order. It is even possible (though unlikely) that TEND is executed first, then the entire transaction, and lastly the TBEGIN executes. Program order is restored through the GCT 232 at completion time. The length of transactions is not limited by the size of the GCT 232, since general purpose registers (GRs) 228 can be restored from the backup register file 224.

During execution, the program event recording (PER) events are filtered based on the Event Suppression Control, and a PER TEND event is detected if enabled. Similarly, while in transactional mode, a pseudo-random generator may be causing the random aborts as enabled by the Transaction Diagnostics Control.

Tracking for Transactional Isolation

The Load/Store Unit 280 tracks cache lines that were accessed during transactional execution, and triggers an abort if an XI from another CPU (or an LRU-XI) conflicts with the footprint. If the conflicting XI is an exclusive or demote XI, the LSU 280 rejects the XI back to the L3 272 in the hope of finishing the transaction before the L3 272 repeats the XI. This "stiff-arming" is very efficient in highly contended transactions. In order to prevent hangs when two CPUs stiff-arm each other, a XI-reject counter is implemented, which triggers a transaction abort when a threshold is met.

The L1 cache directory 240 is traditionally implemented with static random access memories (SRAMs). For the transactional memory implementation, the valid bits 244 (64 rows×6 ways) of the directory have been moved into normal logic latches, and are supplemented with two more bits per cache line: the TX-read 248 and TX-dirty 252 bits.

The TX-read 248 bits are reset when a new outermost TBEGIN is decoded (which is interlocked against a prior still pending transaction). The TX-read 248 bit is set at execution time by every load instruction that is marked "transactional" in the issue queue. Note that this can lead to over-marking if speculative loads are executed, for example on a mispredicted branch path. The alternative of setting the TX-read 248 bit at load completion time was too expensive for silicon area, since multiple loads can complete at the same time, requiring many read-ports on the load-queue.

Stores execute the same way as in non-transactional mode, but a transaction mark is placed in the store queue (STQ) 260 entry of the store instruction. At write-back time, when the data from the STQ 260 is written into the L1 240, the TX-dirty bit 252 in the L1-directory 256 is set for the written cache line. Store write-back into the L1 240 occurs only after the store instruction has completed, and at most one store is written back per cycle. Before completion and write-back, loads can access the data from the STQ 260 by means of store-forwarding; after write-back, the CPU 114 (FIG. 2) can access the speculatively updated data in the L1 240. If the transaction ends successfully, the TX-dirty bits 252 of all cache-lines are cleared, and also the TX-marks of not yet written stores are cleared in the STQ 260, effectively turning the pending stores into normal stores.

On a transaction abort, all pending transactional stores are invalidated from the STQ 260, even those already completed. All cache lines that were modified by the transaction in the L1 240, that is, have the TX-dirty bit 252 on, have their valid bits turned off, effectively removing them from the L1 240 cache instantaneously.

The architecture requires that before completing a new instruction, the isolation of the transaction read- and write-set is maintained. This isolation is ensured by stalling instruction completion at appropriate times when XIs are pending; speculative out-of order execution is allowed, optimistically assuming that the pending XIs are to different addresses and not actually cause a transaction conflict. This design fits very naturally with the XI-vs-completion interlocks that are implemented on prior systems to ensure the strong memory ordering that the architecture requires.

When the L1 240 receives an XI, L1 240 accesses the directory to check validity of the XI'ed address in the L1 240, and if the TX-read bit 248 is active on the XI'ed line and the XI is not rejected, the LSU 280 triggers an abort. When a cache line with active TX-read bit 248 is LRU'ed from the L1 240, a special LRU-extension vector remembers for each of the 64 rows of the L1 240 that a TX-read line existed on that row. Since no precise address tracking exists for the LRU extensions, any non-rejected XI that hits a valid extension row the LSU 280 triggers an abort. Providing the LRU-extension effectively increases the read footprint capability from the L1-size to the L2-size and associativity, provided no conflicts with other CPUs 114 (FIGS. 1 and 2) against the non-precise LRU-extension tracking causes aborts.

The store footprint is limited by the store cache size (the store cache is discussed in more detail below) and thus implicitly by the L2 268 size and associativity. No LRU-extension action needs to be performed when a TX-dirty 252 cache line is LRU'ed from the L1 240.

Store Cache

In prior systems, since the L1 240 and L2 268 are store-through caches, every store instruction causes an L3 272 store access; with now 6 cores per L3 272 and further improved performance of each core, the store rate for the L3 272 (and to a lesser extent for the L2 268) becomes problematic for certain workloads. In order to avoid store queuing delays, a gathering store cache 264 had to be added, that combines stores to neighboring addresses before sending them to the L3 272.

For transactional memory performance, it is acceptable to invalidate every TX-dirty 252 cache line from the L1 240 on transaction aborts, because the L2 268 cache is very close (7 cycles L1 240 miss penalty) to bring back the clean lines. However, it would be unacceptable for performance (and silicon area for tracking) to have transactional stores write the L2 268 before the transaction ends and then invalidate all dirty L2 268 cache lines on abort (or even worse on the shared L3 272).

The two problems of store bandwidth and transactional memory store handling can both be addressed with the gathering store cache 264. The cache 264 is a circular queue of 64 entries, each entry holding 128 bytes of data with byte-precise valid bits. In non-transactional operation, when a store is received from the LSU 280, the store cache 264 checks whether an entry exists for the same address, and if so gathers the new store into the existing entry. If no entry exists, a new entry is written into the queue, and if the number of free entries falls under a threshold, the oldest entries are written back to the L2 268 and L3 272 caches.

When a new outermost transaction begins, all existing entries in the store cache are marked closed so that no new stores can be gathered into them, and eviction of those entries to L2 268 and L3 272 is started. From that point on, the transactional stores coming out of the LSU 280 STQ 260 allocate new entries, or gather into existing transactional entries. The write-back of those stores into L2 268 and L3 272 is blocked, until the transaction ends successfully; at that point subsequent (post-transaction) stores can continue to gather into existing entries, until the next transaction closes those entries again.

The store cache 264 is queried on every exclusive or demote XI, and causes an XI reject if the XI compares to any active entry. If the core is not completing further instructions while continuously rejecting XIs, the transaction is aborted at a certain threshold to avoid hangs.

The LSU 280 requests a transaction abort when the store cache 264 overflows. The LSU 280 detects this condition when it tries to send a new store that cannot merge into an existing entry, and the entire store cache 264 is filled with stores from the current transaction. The store cache 264 is managed as a subset of the L2 268: while transactionally dirty lines can be evicted from the L1 240, they have to stay resident in the L2 268 throughout the transaction. The maximum store footprint is thus limited to the store cache size of 64×128 bytes, and it is also limited by the associativity of the L2 268. Since the L2 268 is 8-way associative and has 512 rows, it is typically large enough to not cause transaction aborts.

If a transaction aborts, the store cache 264 is notified and all entries holding transactional data are invalidated. The store cache 264 also has a mark per doubleword (8 bytes) whether the entry was written by a NTSTG instruction—those doublewords stay valid across transaction aborts.

Millicode-Implemented Functions

Traditionally, IBM mainframe server processors contain a layer of firmware called millicode which performs complex functions like certain CISC instruction executions, interruption handling, system synchronization, and RAS. Millicode includes machine dependent instructions as well as instructions of the instruction set architecture (ISA) that are fetched and executed from memory similarly to instructions of application programs and the operating system (OS). Firmware resides in a restricted area of main memory that customer programs cannot access. When hardware detects a situation that needs to invoke millicode, the instruction fetching unit 204 switches into "millicode mode" and starts fetching at the appropriate location in the millicode memory area. Millicode may be fetched and executed in the same way as instructions of the instruction set architecture (ISA), and may include ISA instructions.

For transactional memory, millicode is involved in various complex situations. Every transaction abort invokes a dedicated millicode sub-routine to perform the necessary abort operations. The transaction-abort millicode starts by reading special-purpose registers (SPRs) holding the hardware internal abort reason, potential exception reasons, and the aborted instruction address, which millicode then uses to store a TDB if one is specified. The TBEGIN instruction text is loaded from an SPR to obtain the GR-save-mask, which is needed for millicode to know which GRs 238 to restore.

The CPU 114 (FIG. 2) supports a special millicode-only instruction to read out the backup-GRs 224 and copy them into the main GRs 228. The TBEGIN instruction address is also loaded from an SPR to set the new instruction address in the PSW to continue execution after the TBEGIN once the millicode abort sub-routine finishes. That PSW may later be saved as program-old PSW in case the abort is caused by a non-filtered program interruption.

The TABORT instruction may be millicode implemented; when the IDU 208 decodes TABORT, it instructs the instruction fetch unit to branch into TABORT's millicode, from which millicode branches into the common abort sub-routine.

The Extract Transaction Nesting Depth (ETND) instruction may also be millicoded, since it is not performance critical; millicode loads the current nesting depth out of a special hardware register and places it into a GR 228. The PPA instruction is millicoded; it performs the optimal delay based on the current abort count provided by software as an operand to PPA, and also based on other hardware internal state.

For constrained transactions, millicode may keep track of the number of aborts. The counter is reset to 0 on successful TEND completion, or if an interruption into the OS occurs (since it is not known if or when the OS will return to the program). Depending on the current abort count, millicode can invoke certain mechanisms to improve the chance of success for the subsequent transaction retry. The mechanisms involve, for example, successively increasing random delays between retries, and reducing the amount of speculative execution to avoid encountering aborts caused by speculative accesses to data that the transaction is not actually using. As a last resort, millicode can broadcast to other CPUs 114 (FIG. 2) to stop all conflicting work, retry the local transaction, before releasing the other CPUs 114 to continue normal processing. Multiple CPUs 114 must be coordinated to not cause deadlocks, so some serialization between millicode instances on different CPUs 114 is required.

In today's systems, accurate tracking of transactional read and write sets is difficult if not impossible.

When a possibly speculative read access is made, a cache line is indicated to be in the read set. When an event causing discarding of speculative execution occurs, no reset occurs. This is similar, for write sets. Thus, read and write sets for transactions necessarily contain speculative overindication, when a later branch misprediction recovery has in fact ejected that (read or write) access from the (read or write) set.

Therefore, it may be advantageous to improve the tracking of read and write sets associated with transactions themselves and allow a processor to recover read and write sets that have been unnecessarily augmented with speculative addresses when a misspeculation is discovered. As such, according to at least one embodiment, the recovery of read and write sets may be allowed when mis speculation is discovered from a set of recovery read and write sets by producing snapshots of the read and write sets when an event that may cause future mis speculation is detected. For example, if a branch is assumed to be misspeculated, then it may be determined that at this point, a snapshot should be created of the read and write set of the transaction. Then, if that range is later mispredicted, the recovery logic (i.e., the branch misprediction) can also recover a read and write set that is more accurate with respect to that point when the branch caused the misspeculation and therefore, discard any incorrectly performed executions that resulted in the unnecessary inclusion of addresses, cache lines or cache bytes in read and/or write sets.

In accordance with at least one embodiment, the problem of excessive interference may be solved by providing accurate, non-speculative read and write sets. Multiple read and write set generations may be associated with each cache line. An active read and write set is used to test interference. The active read and write set represent a speculative "leading edge" set. In accordance with at least one embodiment, when a conditional control flow is processed (e.g., a branch), a snap shot of the current active set is copied to the recovery pool of "past generations" and associated with said branch. When a read or write occurs, a read and write sets a read and write set indication to the active set, and all recovery sets corresponding to branches that are equal to or younger than all of the active set. When a branch misprediction is processed, the recovery active set from the in-order point is recovered. In one embodiment, when a branch is successfully completed, and it is the oldest branch, it's recovery set may be deallocated.

In one embodiment, an insufficient number of generations is provided. When such a scenario happens, the oldest generation is discarded. When a branch misprediction occurs, a recovery copies the recovery state of the next younger branch that is available (When none is, the active set stays unmodified). In another embodiment, no recovery is allocated for new branches being encountered. A recovery of one of these branches leaves the active set in place.

In another embodiment, another branch is deallocated. When the deallocation is complete, and an associated branch has a misprediction, a recovery copies the recovery state of the next younger branch that is available. However, when no younger branch is available, the active set remains unmodified. In accordance with an embodiment supplying multiple bits for multiple threads, each recovery generation for a branch only stores the bits associated to one thread corresponding to the branch being currently executed.

In accordance with some embodiments, interference is always checked against the currently active generation. In another embodiment, interference is checked against all prior generations. If it interferes with the present generation, but not a past generation, then processing of an interference is delayed until the interference is no longer speculative, by ensuring that all branches that correspond to generations not showing an interference have successfully completed (i.e., the interference is actual, and not against speculative state). When a branch misprediction is processed, all younger recovery generations are deallocated from the recovery pool.

Figure 4:
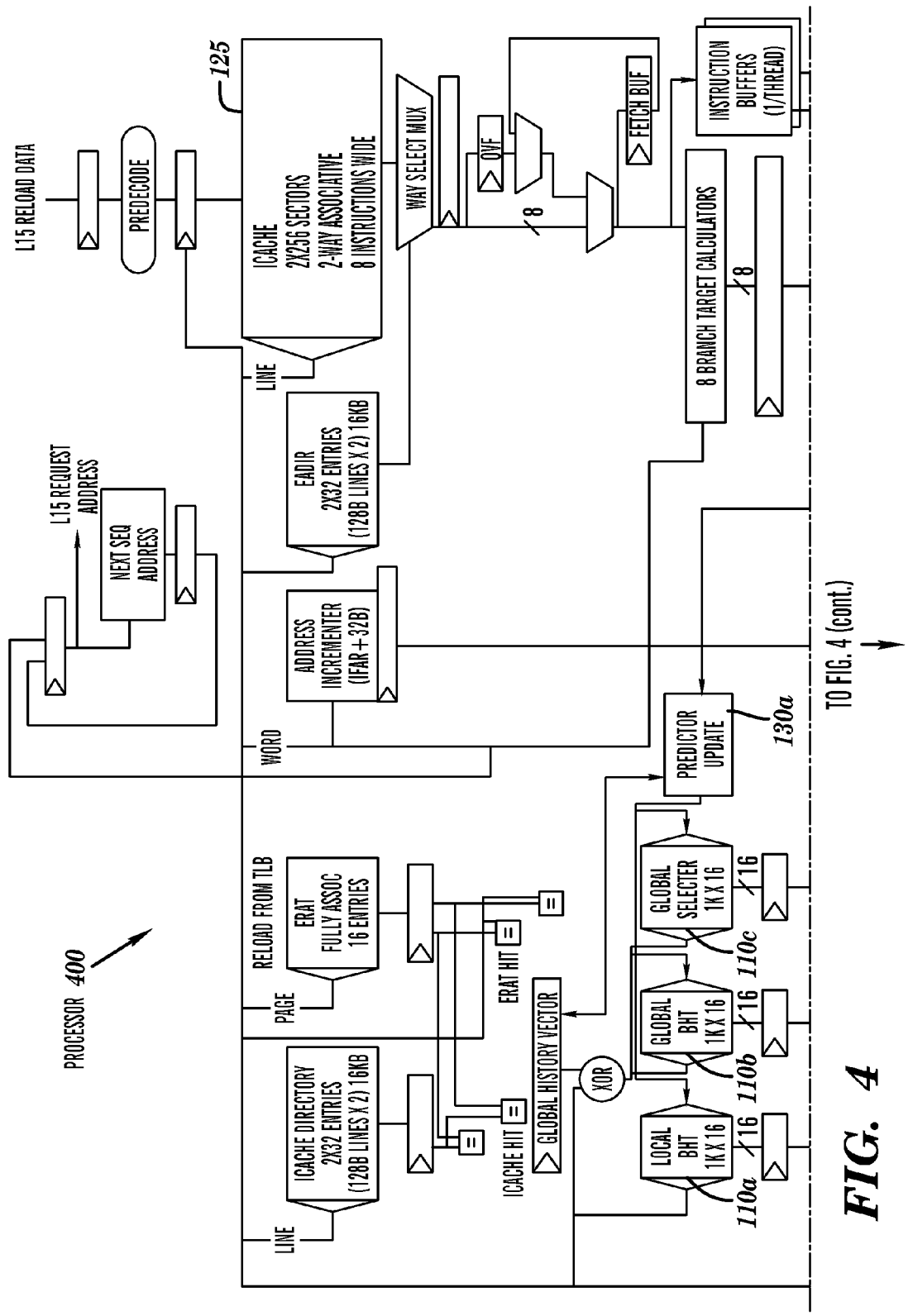
FIG. 4 depicts a conventional processor with predictor update logic, in accordance with present embodiments.
Figure 4:
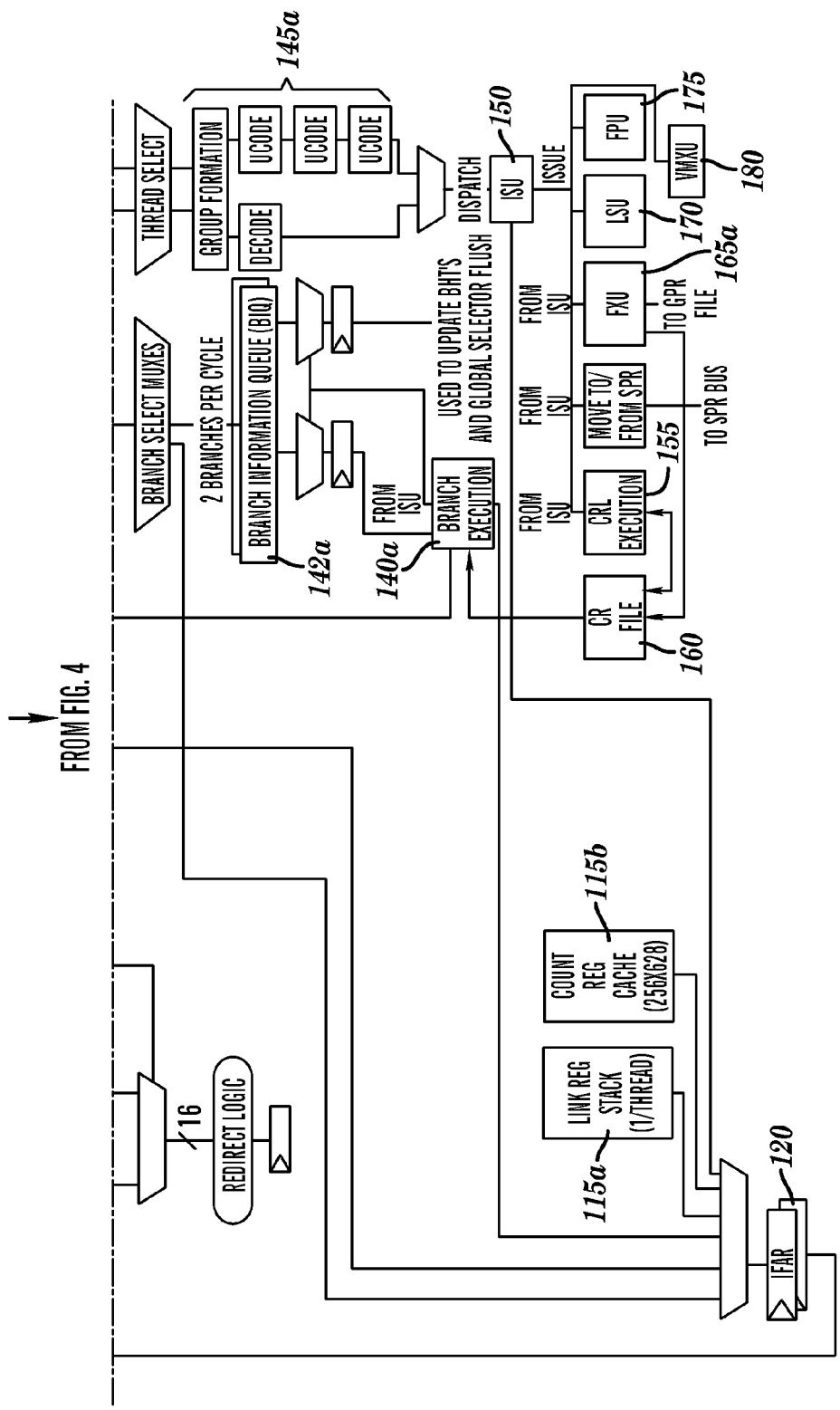

For illustrative purposes, FIG. 4 depicts a conventional processor 400 (i.e., a pipelined processor) with predictor update logic. The processor 400 includes, among other things, prediction hardware, registers, caches, decoders, group formation 145a, an instruction sequencing unit (ISU) 150, a load store unit (LSU) 170, and instruction execution units. In particular, the prediction hardware includes Local Branch History Table (BHT) 110a, Global Branch History Table (BHT) 110b, and Global Selector 110c. The prediction hardware is accessed through an Instruction Fetch Address Register (IFAR) 120, which has the address for the next instruction fetch. In one embodiment, an instruction cache 125 fetches a plurality of instructions referred to as a "fetch group".

The cache and prediction hardware are accessed at approximately the same time with the same address. If the prediction hardware has prediction information available for an instruction in the fetch group, that prediction is forwarded to the ISU 150, which, in turn, issues instructions to units for execution. The prediction may be used to update the IFAR 120 in conjunction with branch target calculation and branch target prediction hardware (such as a link register prediction stack and a count register cache). If no prediction information is available, but the instruction decoders find a branch instruction in the fetch group, a prediction is created for that fetch group, stored in the prediction hardware and forwarded to the ISU 150.

The Branch Execution Unit (BRU) 140a operates in response to instructions issued to it by the ISU 150. The BRU 140a has read access to the condition register file 160. The Branch Execution Unit 140a further has access to information stored by the branch scan logic in the Branch Information Queue (BIQ) 142a, to determine the success of a branch prediction, and is operatively coupled to the instruction fetch address register(s) (IFAR) 120 corresponding to the one or more threads supported by the microprocessor. In accordance with at least one embodiment, BIQ entries are associated with, and identified by an identifier, e.g., by a branch tag BTAG. When a branch associated with a BIQ entry is completed, it is so marked. BIQ entries are maintained in a queue, and the oldest queue entry (entries) is/are de-allocated sequentially when they are marked as containing information associated to a completed branch. The BRU 140a is further operatively coupled to cause a predictor update when the BRU 140a discovers a branch misprediction.

When the instruction is executed, the BRU 140a detects if the prediction is wrong. If so, the prediction needs to be updated. For this purpose, the processor in FIG. 4 also includes predictor update logic 130a. The predictor update logic 130a is responsive to an update indication from Branch Execution Unit 140a and configured to update array entries in one or more of the Local BHT 110a, Global BHT 110b, and Global Selector 110c. The predictor hardware 110a, 110b, and 110c may have write ports distinct from the read ports used by the instruction fetch and prediction operation, or a single read/write port may be shared. The predictor update logic 130a may further be operatively coupled to the link stack 115a and counter register stack 115b.

Referring now to the condition register file (CRF) 160, the CRF 160 is read-accessible by the BRU 140a and can be written by execution units including but not limited to the Fixed Point Unit (FXU) 165a, Floating Point Unit (FPU) 175 and Vector Multimedia eXtension Unit (VMXU) 180. The Condition Register Logic Execution unit (CRL execution) 155 (also referred to as the CRU) and SPR handling logic have read and write access to the Condition Register File (CRF) 160 (access to CRF 160 from SPR handling logic not shown in the interest of simplifying illustration). The CRU 155 performs logical operations on the condition registers stored in the CRF file 160. The FXU 165a is able to perform write updates to the CRF 160.

Figure 5:
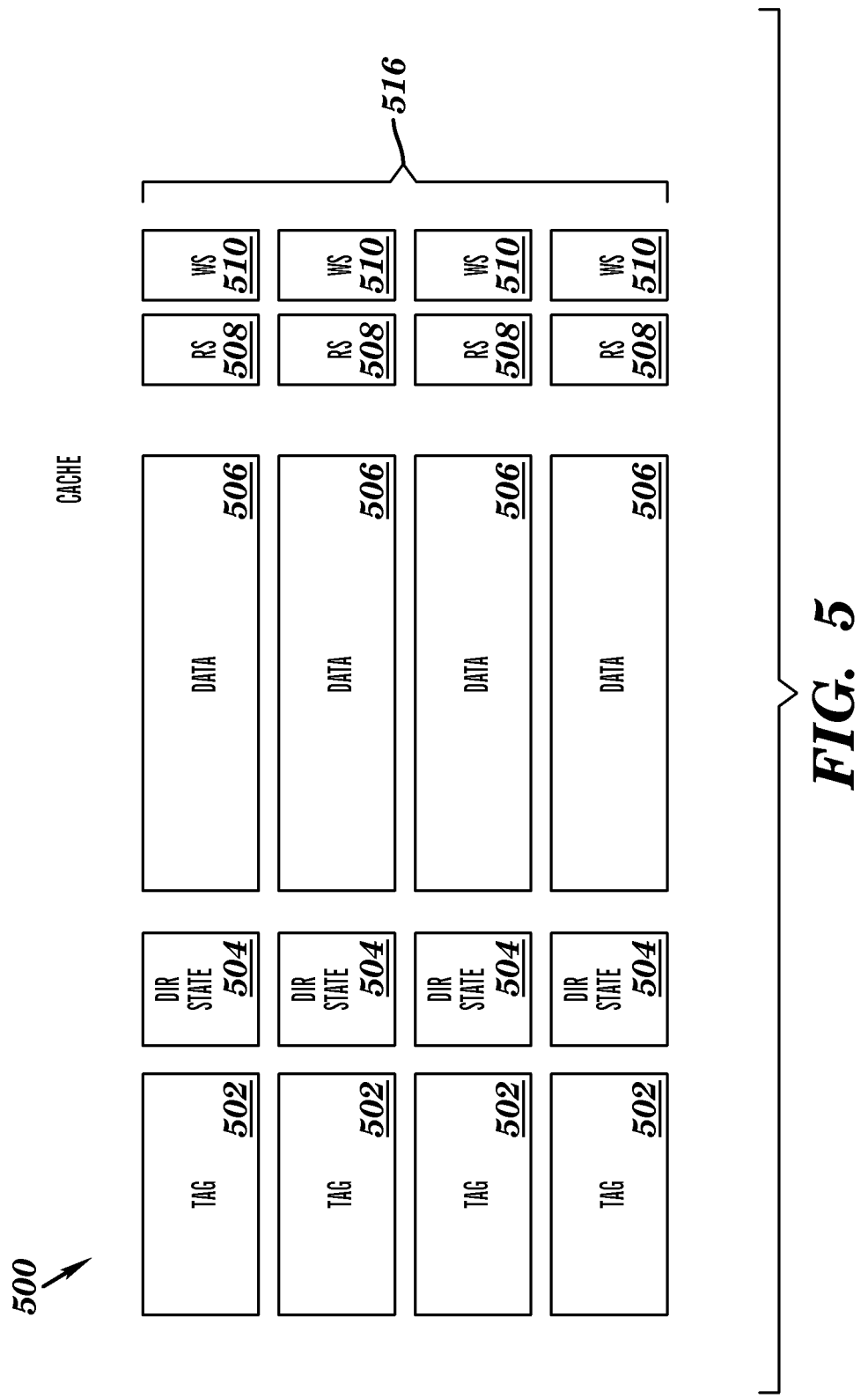
FIG. 5 depicts an exemplary read and write set associated with a data cache in accordance with current methods.

Referring now to FIG. 5, an exemplary read and write set 500 associated with a data cache 280 (FIG. 3) (i.e., L1 cache 240 (FIG. 3)) in accordance with current methods. The L1 cache 240 (FIG. 3) has a transaction read (tx-read) 248 (FIG. 3) field and a transaction dirty (tx-dirty) 252 (FIG. 3) field. The tx-read 252 (FIG. 3) corresponds to the read set (RS) field 508 (FIG. 5) and the tx-dirty 252 (FIG. 3) corresponds to the write set (WS) 510 (FIG. 5). Currently, when an address is generated 236 (FIG. 3), an address is indicated that is subject to a memory access, such as a load, that is being read for a transaction in a cache line that holds the data 506 (FIG. 5). There is an associated bit for each cache line or a subset of bytes (i.e., subline) for each cache line. As such, there may be multiple bits of the read set where each bit corresponds to a subset of the plurality of bytes (i.e., subline) that makes up a cache line, which is shown as data 506 (FIG. 5). Therefore, when an address is accessed, the load and store unit (LSU) 170 (FIG. 4) identifies the cache line by way of indexing and tag match (i.e., tag field 502 (FIG. 5)) for selecting a cache line corresponding to a memory load and for setting a read set indication 508 (FIG. 5) corresponding to the bytes that are being accessed by a specific memory load and then the LSU 170 (FIG. 4) sets that bit 248 (FIG. 3) for that cache line to indicate that this cache line or a subset of bytes of the cache line is now part of that transaction's read (tx-read) set.

Similarly, when a write occurs, write set bits 510 (corresponding to tx-dirty bits 252 of FIG. 3) are being updated with the same mechanism to indicate a write within a transaction has occurred to a particular cache line, or subset of bytes within that cacheline (subline) associated with the tx-dirt or transaction write set bits, and that the line (or subline) is part of the active transaction's write set. The L1 tag 256 (FIG. 3) corresponds to the field tag 502 (FIG. 5) associated with each cache line 516 (FIG. 5). With respect to FIG. 5, 4 cache lines 516 (FIG. 5) are depicted for example purposes only. Each cache line 516 (FIG. 5) may be stored and associated with a different tag 502 (FIG. 5). The valid bit 244 (FIG. 3) is an exemplary directory state and corresponds to field 504 (FIG. 5).

Figure 6:
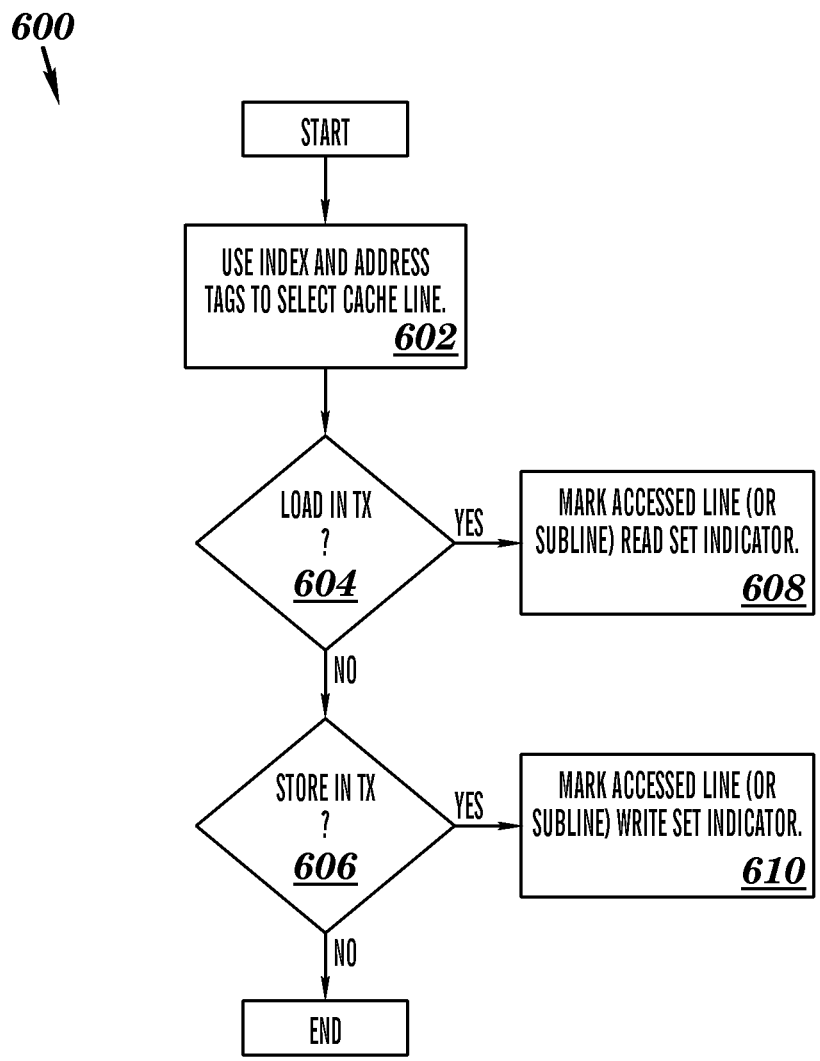
FIG. 6 depicts an operational flowchart illustrating a marking flow in accordance with current methods.

Referring now to FIG. 6, an operational flowchart 600 illustrating a marking flow in accordance with current methods is depicted. FIG. 6 illustrates a method for the processing of read and write set indicators in conjunction performed in LSU 280 in conjunction with the processing of load and store instructions. The process of marking is generally associated with the process of accessing the cache. The address calculation 236 (FIG. 3) divides the address into an index that selects one of multiple cache line groups that makes up an associativity set. Address tags 502 are used to match and identify which of multiple memory addresses that have the same index correspond to which cache line 516. As such, a cache line 516 is identified in a cache that corresponds to a specific address. Therefore at 602, the index and the address tags are used to select a cache line. As such, the index and address tags 502 (FIG. 5) are used to identify a cache line 516 (FIG. 5) within a cache 240 (FIG. 3) to read-access memory data and update read sets 508 (FIG. 5) and to write access memory data (optionally in conjunction with a store queue 250) and update write sets 508 (FIG. 5) that are associated with a cache line 516 (FIG. 5). Responsive to a cache miss (not shown), a cache reload is performed before processing resumes with step 602 to select a cache line. Then at 604, it is determined whether the operation being performed corresponds to a load operation. If at 604, it is determined that the operation being performed corresponds to a load operation then at 608, such as a memory load instruction or a read operand of a compute instruction that uses memory operands (which would also qualify as a load), then at 608, the read set indicator associated with the cache line or associated with the subset of bytes of that cache line is then marked as being part of that transaction's read set 508 (FIG. 5). If at 604, it is determined that the operation being performed does not correspond to a load operation then at 606, it is determined whether the operation being performed corresponds to a memory store or a compute operation that performs a store to memory as one of the compute operation's write operands that receive a result of the compute operation. If at 606, it is determined that the operation being performed corresponds to a store operation then at 610, the write set indicator associated with the cache line or the subset of the bytes of the cache line is indicated as being part of the transaction's write set by setting that bit 510. Then the marking flow would terminate with respect to the marking of read and write sets.

In a preferred embodiment, other operations typically associated with the loading and storing of memory operands (not depicted in FIG. 6) with respect to the marking of read sets 508 (FIG. 5) and the marking of write sets 510 (FIG. 5) are included, such as the current methods of a microprocessor 400 (FIG. 4) in parallel and in conjunction with performing the operations previously described in FIG. 6. The current methods may include selecting bytes from a cache line and returning bytes from the cache line to the microprocessor core 400 (FIG. 4) aligning, rotating or otherwise preparing for processing those bytes and making them available to the processor or conversely responsive to a store operation to update the store data into first the store queue and updating the data into the cache line of the cache that is associated with the address to which the data is to be written.

Figure 7:
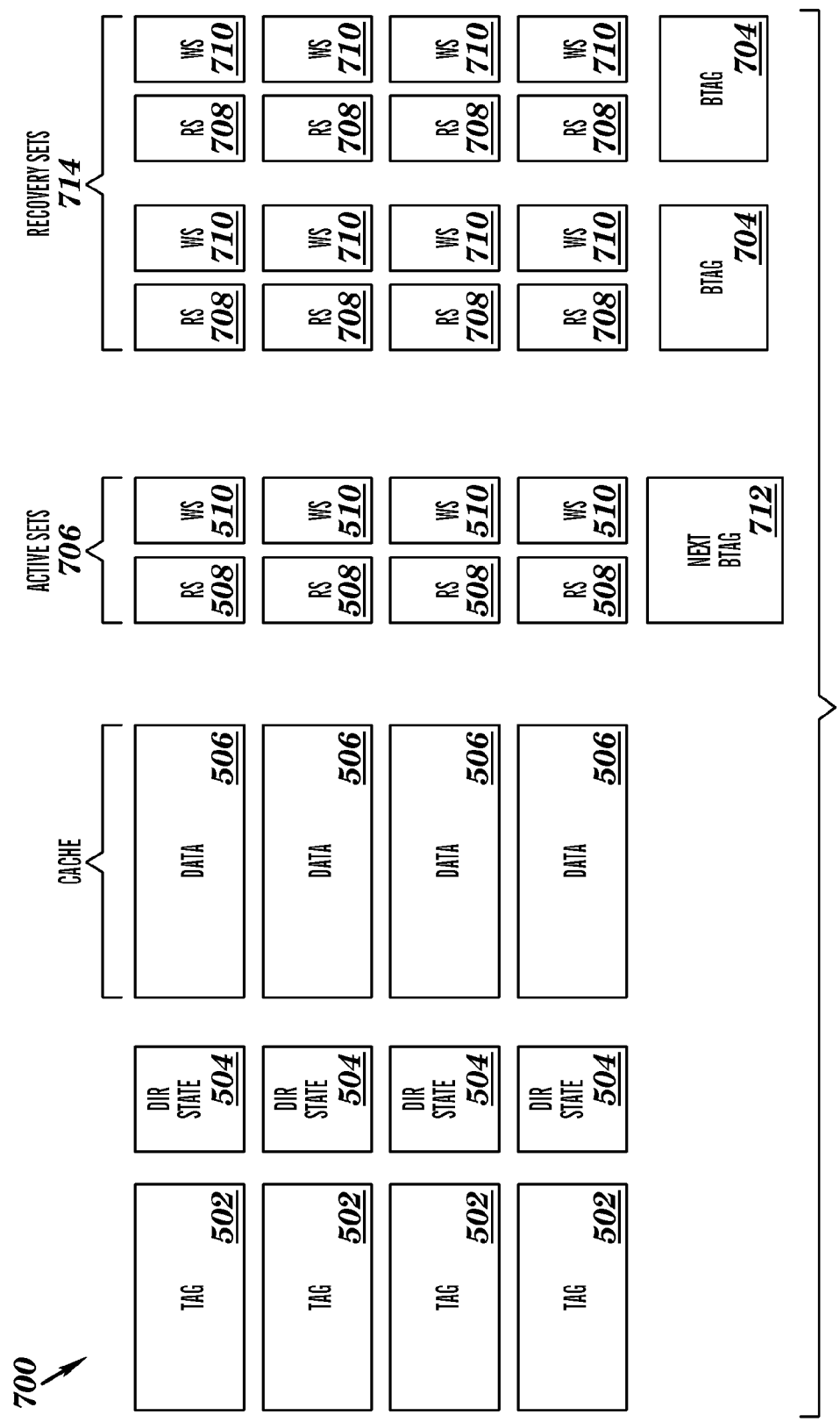
FIG. 7 depicts exemplary read and write sets augmented with recovery sets in accordance with present embodiments.

Referring now to FIG. 7, exemplary read and write sets augmented with recovery sets 700 in accordance with present embodiments are depicted. The field labeled next BTAG 712 is a conceptual association indicating the active set being reflective of the recovery set for the next to-be-selected recovery point associated with the "next BTAG". As such, the next BTAG 712 may be computed in the future and does not necessarily have to be stored next to or in close relation to the actual read and write set. As depicted in FIG. 7, a number of additional storage locations have been added to the current methods that were previously described with respect to FIG. 5. These additional storage locations may hold additional copies or additional versions of read sets 708 and write sets 710 that collectively may be termed recovery sets 714. The recovery sets 714 are a set of read sets 708 and write sets 710 that may be used for the purpose of recovering a more accurate read set 708 or write set 710 to restore to active read sets 508 and 510 at a specific point in the program where misspeculation may have occurred, such that program execution would roll back to that point. The recovery set 714 would represent a more accurate read set 708 and write set 710 corresponding to that point in the program. It is not necessary for a recovery set to be a fully accurate representation of the minimal read and write set of a possible rollback point, Rather, for functional correctness, it needs to be a superset and it still may include some unnecessary cache lines (or sublines) in read sets 708 and write sets 710 indicating additional data that is part of the recorded read sets 708 and write sets 710, but is not, in fact, representative of an read or write access having occurred up to a rollback point. This property can be used to reduce the number of maintained recovery sets and share a single recovery set among multiple possible program points to which a rollback can occur responsive to a rollback indication To associate these recovery sets 714 with points in the program where misspeculation may have occurred, the recovery sets 714 are associated with an indicator (i.e., a branch tag (BTAG) 704) which is a tag that is a unique identifier for a branch reflecting the use in one preferred embodiment where recovery sets 714 reflect, correspond or are associated with predicted branches that may be found to have been mispredicted at a later time and speculatively executed instructions may be flushed from the microprocessor and rolled back to the program in-order point at which the branch instruction was in the program. The recovery set 714 associated with that branch would then be available for restoring a more accurate read set 708 and write set 710 of a transaction to active read set 508 and active write set 510 when the branch misprediction has occurred within the scope of a transaction. According to the present embodiments, it is not intended to limit the points with which recovery sets 714 are associated to branches in the program. Rather, it may be any other points in the program that a microprocessor may want to roll back responsive to an event which requires the processor to discard speculative execution. The active set 706 corresponds to the read set 508 and write set 510 as it is maintained at the very head of execution. The active set 706 represents a speculative state including all the speculated instructions and it may be viewed as being the snapshot of the read and write set to be used as recovery set for the next future events that may cause a misspeculation. As such, the active set 706 is an incrementally built set of read and write accesses of the transaction. When an instruction that may cause misspeculation is encountered in the order of instructions executed from the program, it represents the state of the read set 508 and write set 510 at that next point. Therefore, the active set 706 is the active working copy that will be copied in the next future recovery set.

Figure 8:
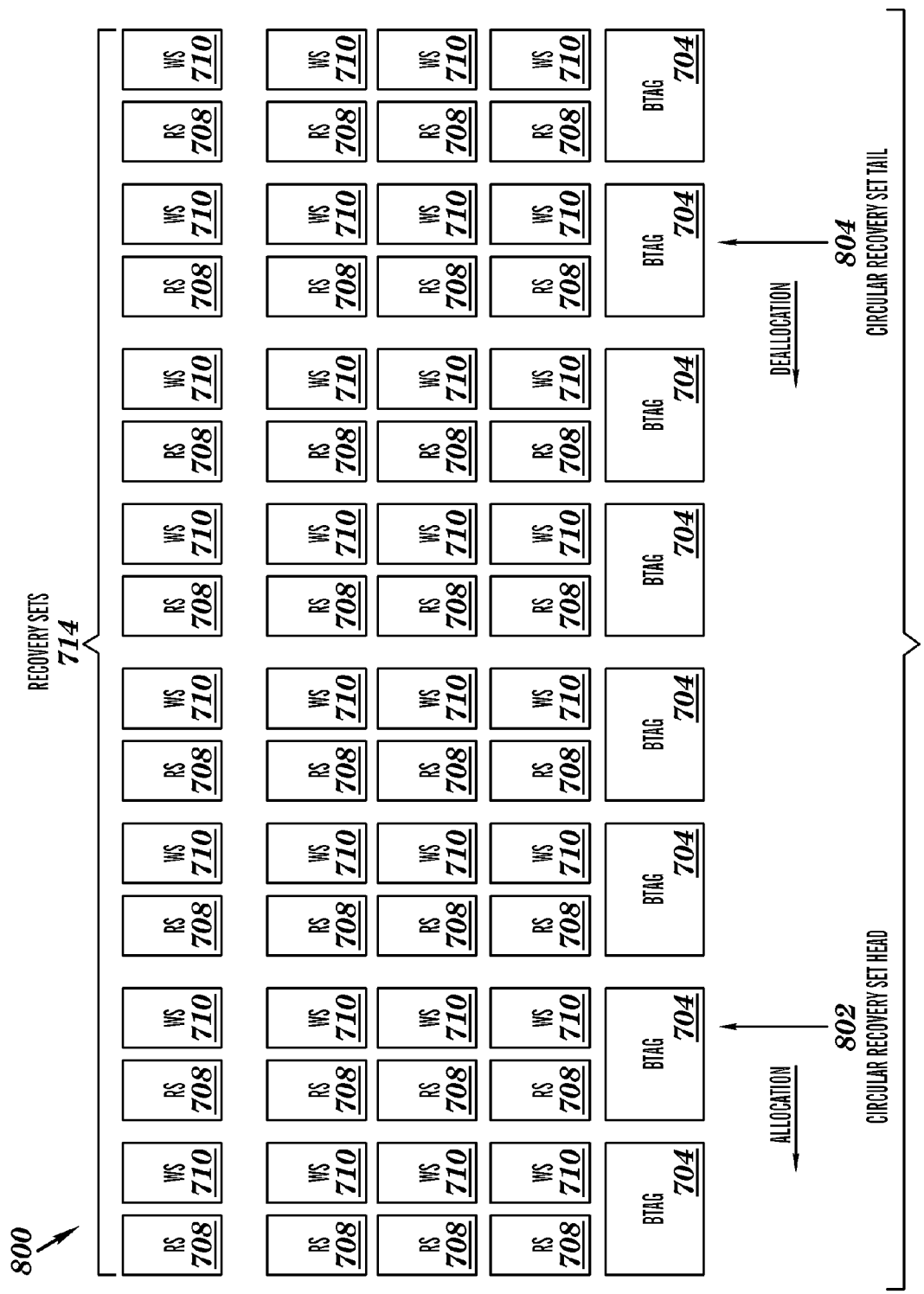
FIG. 8 depicts the management of recovery sets in accordance with present embodiments.

Referring now to FIG. 8, the management of recovery sets 800 in accordance with embodiments of the present embodiments is depicted. Eight exemplary recovery sets consisting of read sets 708 and write sets 710 for the cache are shown in an exemplary embodiment. Each read set 708 and write set 710 is associated with a position in a program to which a roll back or flush may occur responsive to misspeculation. As a new point in the program is discovered, which may represent a point to which a rollback may occur, then a new recovery set 714 is allocated at the head of the queue 802 of the recovery sets 714 corresponding to a transaction with the associated BTAG 704 indicating a possible rollback point. Conversely, when a point in the program that represented a possible point to which the processor may roll back responsive to misspeculation is completed, the processor may no longer roll back to that point. As such, that recovery set may be deallocated for that read set 708 and write set 710 associated in a transaction. Furthermore, the snapshot or pointer corresponding to the possible rollback point within the transaction is no longer needed and the tail pointer 802 that keeps track of the earliest speculation roll back point in time is moved to the left since it is no longer an active recovery set 714 and a rollback to that point can no longer occur. Recovery sets 714, according to one embodiment, are managed as a circular queue (or circular buffer) with a head pointer 802 and a tail pointer 804. When the head pointer 802 is advanced, a new recovery set 714 is allocated, and becomes unavailable for further future allocation. When the tail pointer 804 is advanced, a recovery set 714 is deallocated, and it becomes available for future allocation. While the exemplary embodiment herein may use a circular queue for example purposes only, other recovery set 714 management techniques may be used within the scope of the present embodiments.

Figure 9:
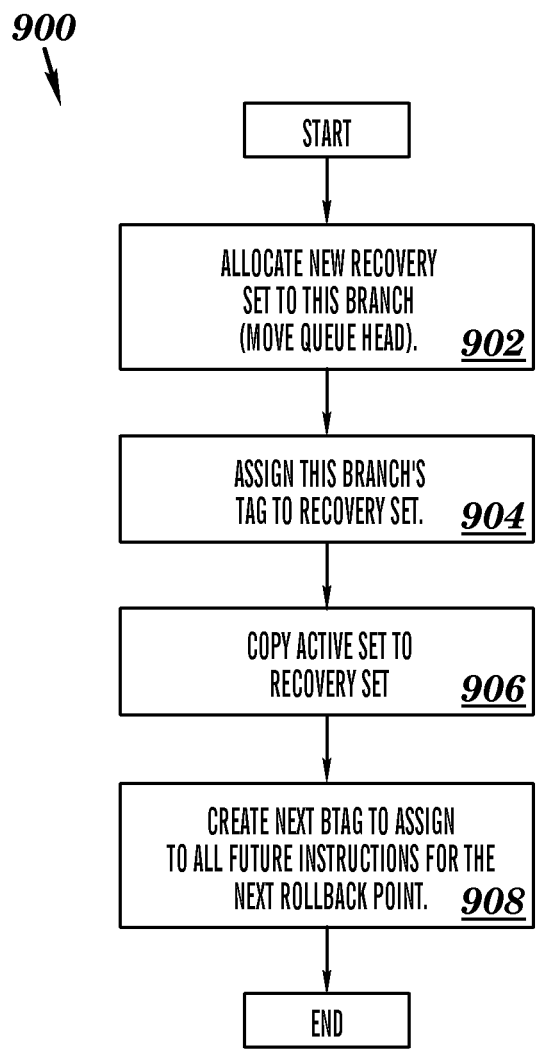
FIG. 9 depicts an operational flowchart associated with selecting a recovery point, in accordance with present embodiments.

Referring now to FIG. 9, an operational flowchart 900 associated with creating a recovery point, in accordance with present embodiments is depicted. The method depicted in FIG. 9 may be executed when a possible recovery point to which the processor may roll back is identified within a program. According to at least one embodiment, such rollback points may correspond to branches that may have been mispredicted and will force a rollback when the misprediction is discovered. As such, branch predicting checking logic may be implemented to rollback execution when a branch misprediction is detected in a processor.

When a possible rollback point in a program is identified, a new recovery set is allocated to the recovery point, such as a branch to which the rollback may occur. As such, at 902, a new recovery set is allocated (i.e., the queue head 802 is moved in one exemplary embodiment using circular queues) to the identified branch where a misprediction may be detected later in time. As previously described with respect to FIG. 8, this may be implemented using a queue instruction by moving the queue head to the left to add one more recovery set 714 (FIG. 8) to the list of possible recovery sets 714 (FIG. 8).

Then at 904, the branch's tag is assigned to the recovery set. As such, it further associates the newly allocated recovery set 802 (FIG. 8) in the queue of active recovery sets 706 (FIG. 7) to the point in the program where the recovery set 714 is created for example, by assigning a tag associated with the possible rollback point (e.g. a BTAG 704 (FIG. 8) to that recovery set. Next at 906, the active set 706 is copied to the recovery set so that the recovery set now contains a current snapshot of the active set associated with the rollback point to recover to and then at 908 a new BTAG 712 (FIG. 7) or indicator is allocated or assigned to all future instructions for the next rollback point (i.e., next BTAG 712 (FIG. 7)). The next BTAG 712 (FIG. 7) is an indicator of the next BTAG. The BTAG may be derived algorithmically (i.e., the algorithm to move forward to the next BTAG). In other embodiments, other rollback points in addition to or in lieu of branches, or mispredicted branches, may be selected and identified with a tag or identifier and such tag or identifier may be used to associated a recovery set with the identified rollback point.

Figure 10:
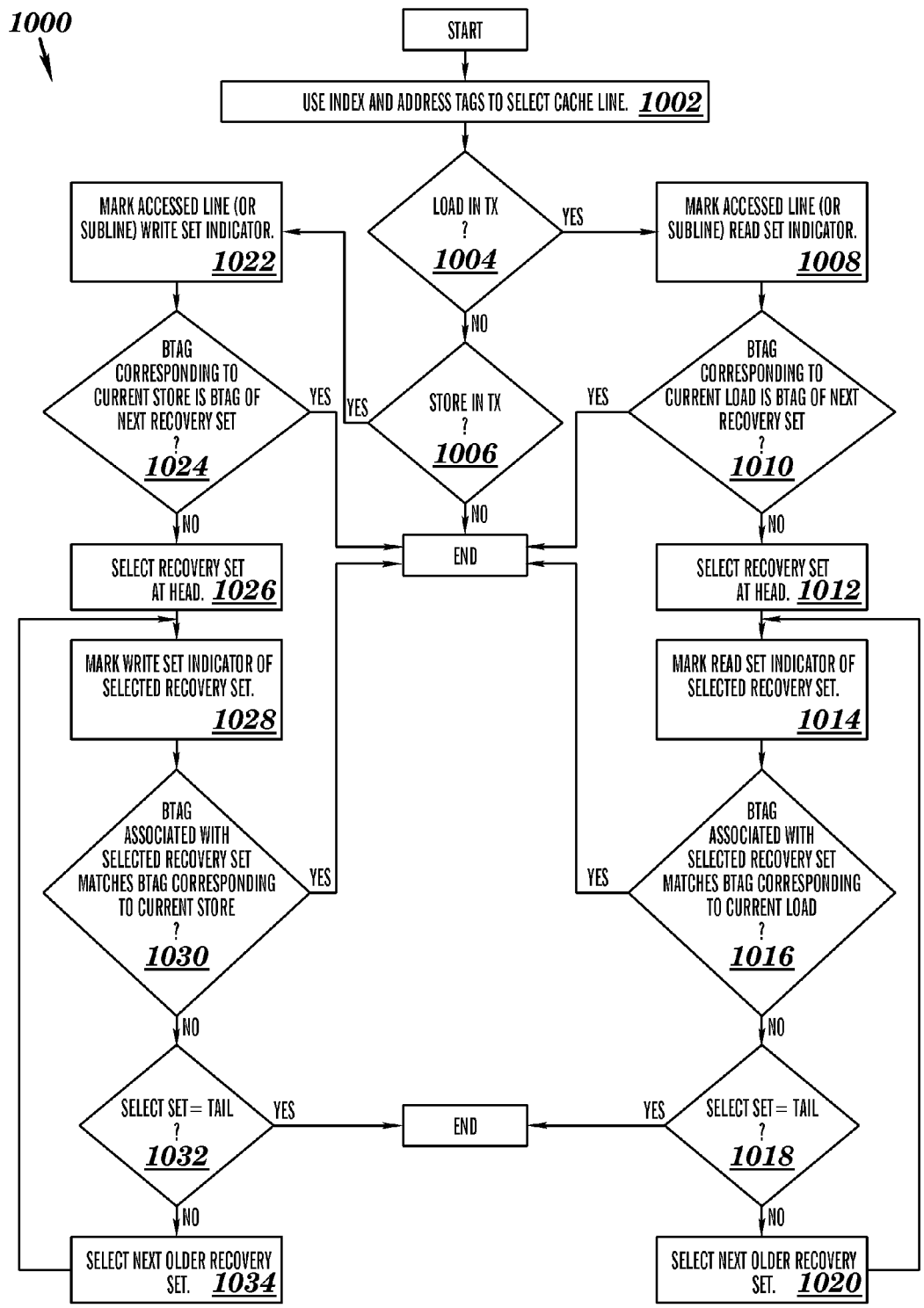
FIG. 10 depicts an operational flowchart associated with marking cache lines, in accordance with present embodiments.

Referring to FIG. 10, there is shown an operational flowchart 1000 of a method associated with the marking of read and write sets associated with cache lines, in accordance with present embodiments. The marking of cache lines includes the marking of sublines of a cache line (i.e., groups of pluralities of bytes within a cache line) that are associated with a separate read and write set indicator according to at least one embodiment. The flowchart illustrated in FIG. 10 is executed in conjunction with memory access operations, such as load (i.e., including read operands of compute instructions) and store operations (i.e., including a target or write operand of a compute instruction). When a cache miss occurs, a cache reload occurs prior to processing of the present method (not shown). Once the data is in the cache, the data in the cache is identified and at 1002, the index and address tags are used to select a cache line corresponding to the memory access. The cache line associated with a specific memory operation is identified by way of computing the address and by then using an index and then the address tag associated with the address in accordance with the cache architecture to select the cache line storing the data. When the data is not on the cache, the data needs to be brought into the cache by either performing a memory operation or by performing a multiprocessor protocol request to obtain the data if it is owned by another processor before processing restarts. Then at 1004, it is determined whether the memory operation corresponds to a load operation. If it is determined at 1004 that the memory operation corresponds to a load, then at 1008 the accessed line (or subline) read set indicator of the active set is marked.

Then at 1010, it is determined whether the BTAG (associated with a load at 1006) corresponding to the current load is the BTAG 712 of the next recovery set (i.e., next BTAG 712 (FIG. 7). If at 1010, it is determined that the BTAG corresponding to the current load is the BTAG 712 (FIG. 7) of the next recovery set (i.e., the active set) then the program terminates since it is a load that was encountered after the last possible rollback point for which a recovery set has been stored. If it is determined that the BTAG corresponding to the current load is not the BTAG 712 (FIG. 7) of the next recovery set (i.e., the BTAG is associated with a previously seen branch to which a rollback may occur) then at 1012, the recovery set at the head of the queue (i.e., circular recovery set head 802 of FIG. 8) is selected and at 1014 the read set indicator of the selected recovery set that was identified by the index and the address tag is marked thereby marking previous generations of recovery sets prior to which present load instruction was fetched in the original program order. Next, at 1016, it is determined whether the BTAG 704 (FIG. 7) associated with the selected recovery set matches the BTAG corresponding to a current load. If is determined at 1016 that the BTAG 704 (FIG. 7) associated with the selected recovery set matches the BTAG corresponding to a current load then the method terminates since all the recovery sets that were created after the load in its original program order have been identified and marked as containing said load. If is determined at 1016 that the BTAG 704 (FIG. 7) associated with the selected recovery set does not match the BTAG 704 (FIG. 7) corresponding to a current load then at 1018 it is determined whether the selected set is equal to the circular recovery set tail 804 (FIG. 8). If is determined at 1018 the selected set is equal to the circular recovery set tail 804 (FIG. 8) then the method ends. If is determined at 1018 the selected set is not equal to the tail then at 1020 the next older recovery set is selected and the program continues back to step 1014 marking the read set of the selected recovery set until the end of the circular queue is reached, or a recovery set matching the BTAG associated to the present load instruction (in accordance with step 1006 in an exemplary embodiment) is found.

However, if at 1004, it is determined that the memory operation does not correspond to a load operation, then at 1006 it is determined whether the memory operation corresponds to a store operation. If at 1006, it is determined that the memory operation does not correspond to a store operation, then the method terminates. If at 1006, it is determined that the memory operation does correspond to a store operation, then at 1022 the accessed line (or subline) write set indicator is marked.

Next, at 1024, it is determined whether the BTAG corresponding to the current store and having been associated to the store by step 1006 is the BTAG 712 (FIG. 7) of the next recovery set (i.e., the active set). If it is determined at 1024 that the BTAG corresponding to the current store is the BTAG 712 (FIG. 7) of the next recovery set (i.e., corresponding to the currently active set), then the program terminates. If it is determined at 1024 that the BTAG corresponding to the current store is not the BTAG 712 (FIG. 7) of the next recovery set, then at 1026 the recovery set at the head of the queue is selected. Then at 1028, the write set indicator of the selected recovery set associated to the cache line or cache subline identified in step 1002 is marked.

Next at 1030, it is determined whether the BTAG 704 associated with the selected recovery set matches the BTAG 704 (FIG. 7) corresponding to the current store assigned at step 1006. If at 1030, it is determined that the BTAG 704 (FIG. 7) associated with the selected recovery set matches the BTAG corresponding to the current store then the program terminates. If at 1030, it is determined that the BTAG 704 (FIG. 7) associated with the selected recovery set does not match the BTAG corresponding to the current store (and assigned at 1006) then it is determined at 1032 whether the selected set is equal to the tail. If at 1032, it is determined that the selected set is equal to the tail, then the program terminates. If at 1032, it is determined that the selected set is not equal to the tail then at 1034 the next older recovery set is selected and the program continues back to step 1028 to mark the write set indicator of the selected recovery set.

Each memory access in a transaction is marked with a BTAG 704 (FIG. 8) or another tag that identifies a rollback point. To identify a rollback point, the active set conceptually corresponds to the next upcoming BTAG 704 (FIG. 8) corresponding to the next upcoming rollback point and to be associated to the next recovery set; or another tag identifying a rollback point corresponding to the next such rollback point and to be associated to the corresponding recovery set when allocated. When a memory access is performed, an associated tag identifies the first recovery set to include that access (i.e., the recovery set associated to the first instruction—or other program point—that is identified as constituting a rollback point after that instruction), and all the younger recovery sets associated to rollback points after that initial rollback point following the memory instruction and also containing this memory instruction in their respective read or write sets. Therefore, the identified rollback point to contain the access does not occur before the memory instruction but corresponds to the first possible rollback after the instruction, and transitively, all successive recovery sets. The memory instruction remains properly marked based on its location in the code and regardless of whether it executed before or after a generation snapshot by the method being adapted to mark all recovery sets between the active set and the identified first recovery set. Each instruction that needs a rollback either has its own snapshot BTAG 704 (FIG. 8), or has a BTAG 704 (FIG. 8) associated with it that is over-conservative (i.e., it contains at least the appropriate read and write sets and may have more read and write sets), which can be obtained, e.g., by selecting a recovery set associated with rollback point after said rollback point. As such, every instruction that may cause a rollback needs can be associated with a rollback point.

Figure 11:
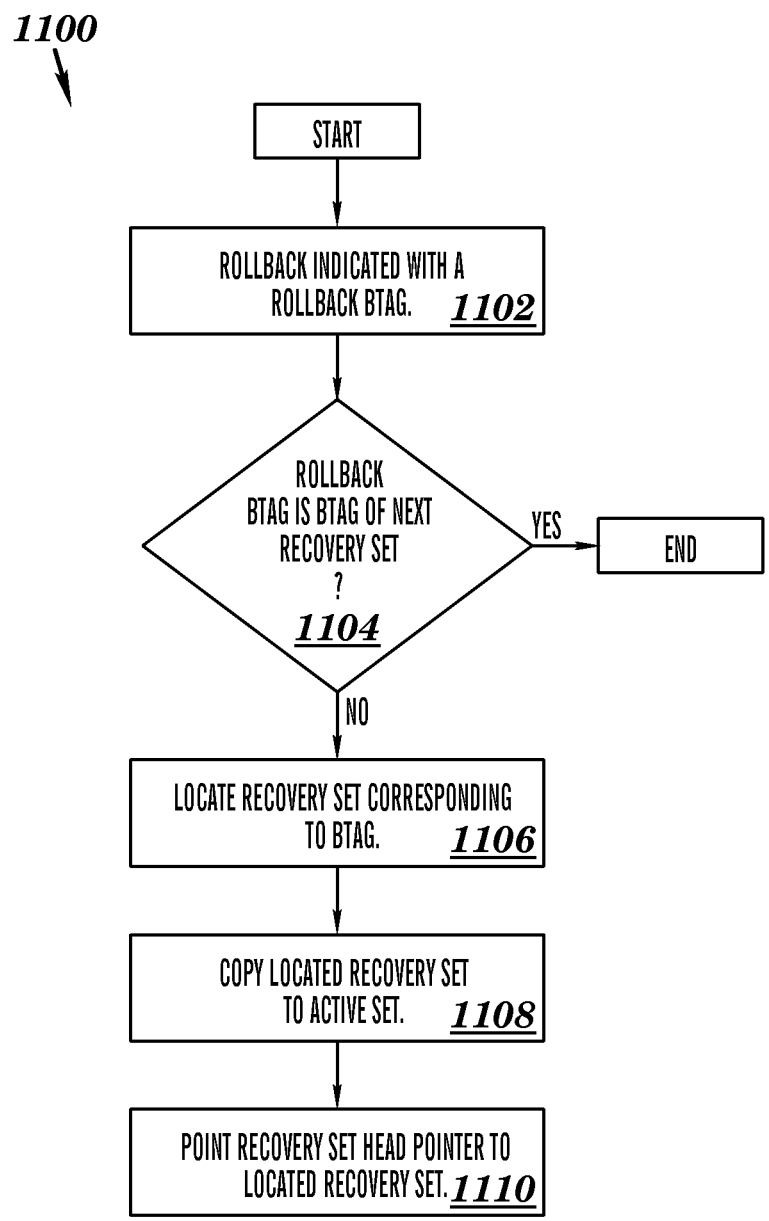
FIG. 11 depicts an operational flowchart illustrating a rollback or flush in the core of the microprocessor in accordance with present embodiments.

Referring now to FIG. 11, an operational flowchart 1100 illustrating a rollback or flush in the core of the microprocessor is depicted. For example, if a branch misprediction is discovered and the processor had determined that speculative operations should be discarded, then the speculative operations would be flushed from the pipeline. The flushing of the speculative operations from the pipeline may occur in conjunction with the present embodiment and therefore, at the same time as flushing of the speculative operations from the pipeline occurs, a recovery set for a transaction's read and write set is recovered as well which corresponds to the read and write set that most accurately reflects the read and write set at the roll back point. One goal of the present embodiment is to maintain and restore recovery sets for read sets 508 (FIG. 8) and write sets 510 (FIG. 8) as rollbacks (i.e., flushes) in the microprocessor are discovered and to restore the read set 708 (FIG. 8) and write set 710 (FIG. 8) that most accurately reflects the read set 508 (FIG. 8) and write set 510 (FIG. 8) at the rollback point rather than to just reusing the speculatively updated read set 508 (FIG. 8) and write set 510 (FIG. 8) without recovery in accordance with the prior art. According to at least one embodiment, the recovery sets 714 (FIG. 7) are examined in order to locate recovery set with a BTAG 704 (FIG. 7) that is equal to the received rollback or other indicator that is associated with the roll back point and in conjunction with which the recovery set was allocated when that instruction or point in the program was first identified.

At 1102, a rollback is indicated and a rollback BTAG is provided identifying the rollback point. When a rollback is indicated, it is also indicated through logic that is operatively coupled to the recovery sets 714 (FIG. 7) shown in conjunction with the data cache 506 (FIG. 7) and more generally with respect to the LSU 280 (FIG. 3) and the data cache 240 (FIG. 3) shown therein. The purpose is to locate the recovery set 714 (FIG. 7) that is associated with a BTAG 704 (FIG. 7) corresponding to the rollback BTAG. Then at 1104 it is determined whether the received rollback BTAG is the same as the BTAG of the next recovery set (i.e., next BTAG 712 (FIG. 7)), i.e., the active set.

At 1104, if it is determined that the rollback BTAG is the BTAG 712 (FIG. 7) of the next recovery set (FIG. 7), then the program terminates since the next snapshot corresponding to the present rollback point may be after the most recent allocated recovery set 714 (FIG. 7) and as such, there is no recovery set that corresponds to the provided rollback BTAG 714; or the other indicator in the recovery set 714 (FIG. 7) if an identifier other than a BTAG is used to identify rollback points. If the rollback point corresponds to a point since the last recovery set 714 (FIG. 7) was taken, then there is no recovery snapshot to use. Therefore, the current memory read set 508 (FIG. 7) and write set 510 (FIG. 7) for a transaction continue to be used. This is in accordance to how the active sets are maintained. The active sets are always a superset of all previous possible recovery points. As previously discussed, an over-indication of a read and write set is always functionally correct. It may lead to some unnecessary interferences to be diagnosed, however, correctness is preserved since no interferences may be missed. In at least some execution scenarios, a transaction may be aborted because of a false interference and the transaction would need to be restarted.

Figure 12:
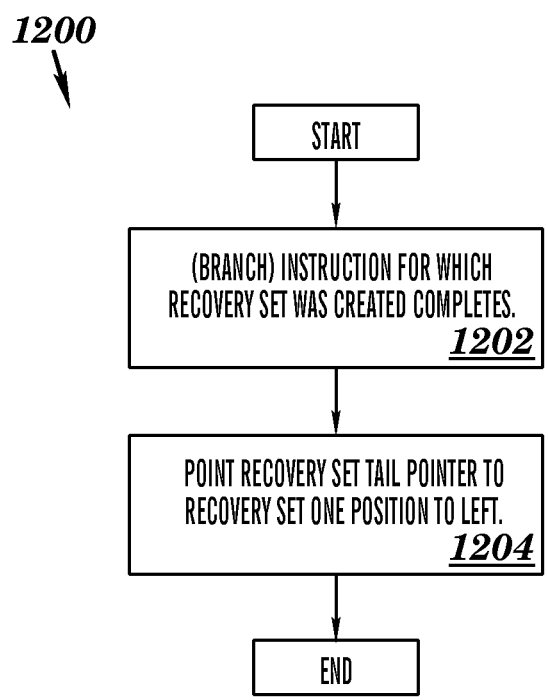
FIG. 12 depicts an operational flowchart illustrating a branch instruction for which rollback was allocated and completes, in accordance with present embodiments.

However, if at 1104, it is determined that the rollback BTAG 704 is not the BTAG 712 (FIG. 7) of the next recovery set, then at 1106, the recovery set 714 (FIG. 7) corresponding to the BTAG 704 (FIG. 7) is located. In one exemplary embodiment this is performed by searching a circular queue of FIG. 8. Next at 1108, the located recovery set 714 (FIG. 7) is copied to the active set 706 (FIG. 7) and at 1110, the recovery set head pointer 802 is pointed to the located recovery set (FIG. 8). Thereby all recovery sets are deallocated 804 (FIG. 8) that are more recent (i.e., younger) than the located recovery set. In another embodiment, a circular queue may not be used to locate recovery sets, but some other implementation may be used to locate the most recent recovery set, e.g., a list, a tree, an associative lookup, a binary search, a hash search, and so forth Referring now to FIG. 12, an operational flowchart 1200 illustrates the completion of an instruction for which a recovery set was allocated. According to one implementation of the present embodiment, the instructions may be branch instructions, however, in other implementations, other instructions may similarly be associated with recovery sets. At 1202, a branch (or other instruction) for which a recovery set was created, completes. In at least one embodiment, instructions complete in order, e.g., in conjunction with a global completion table (GCT).

Then at 1204, the recovery set tail pointer 804 (FIG. 8) is set one position to the left, thereby deallocating and reclaiming that recovery set 714 (FIG.) from the set of active recovery sets 706 (FIG. 8) and making it available for future use to store another recovery set 714 (FIG. 8). In other embodiments, if a circular buffer is not used, then other appropriate deallocation measures would be taken to discard the recovery set 714 (FIG. 8). Additionally, when a circular buffer is not used it is more feasible to deallocate recovery sets 714 (FIG. 8) out of order. Therefore, when instructions associated with a recovery set complete and can no longer trigger a rollback then the associated recovery set can likewise be deallocated even when it is out of order with respect to other instructions, but will require a different management mechanism from the mechanism described in FIG. 12 with respect to a circular buffer.

Figure 13:
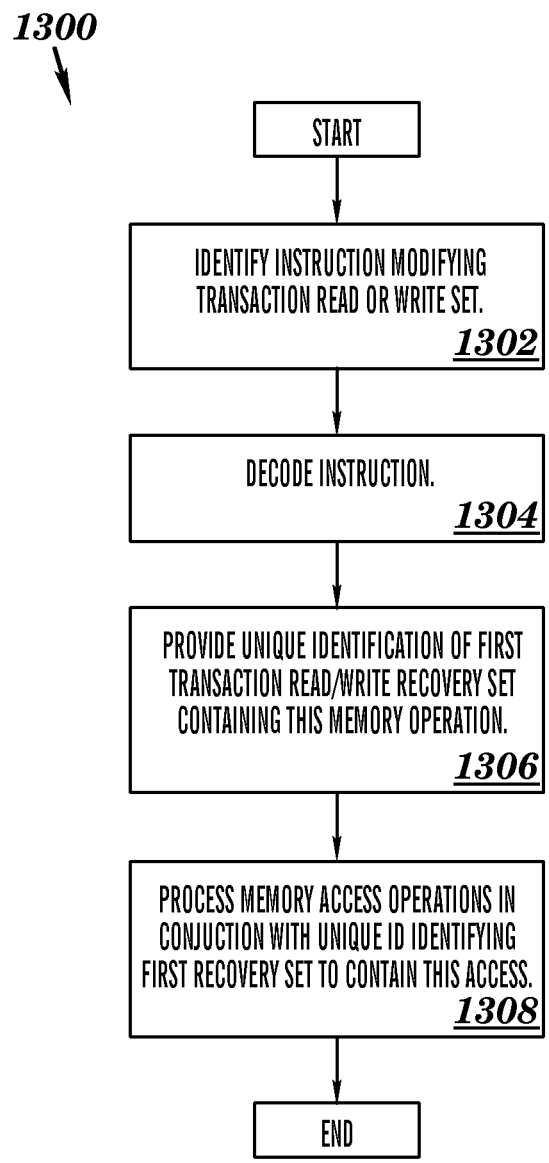
FIG. 13 depicts an operational flowchart illustrating the decoding and core processing of instructions modifying at least one of a transaction read and write set, in accordance with present embodiments.

Referring now to FIG. 13, an operational flowchart 1300 illustrating the decoding and core processing of instructions modifying at least one of a transaction read and write set, in accordance with present embodiments is depicted. In accordance with an embodiment, processing of instructions may update a transaction's read set 708 (FIG. 8) or write set 710 (FIG. 8). At 1302, an instruction is identified that modifies a transactions' read or write set, such as a memory load instruction, a memory store instruction, or a compute instruction that may take a memory operand, (e.g., a read operand that would be treated similarly to a memory load instruction or a write operand that would be treated similarly to a memory store instruction). After those instructions are identified, the instructions are decoded at 1304 and one or more internal operations are generated corresponding to the decoded instruction. In conjunction with the decoding step at 1304, the decode logic or logic associated to the decode logic at 1306 provides a unique identification of the first transaction read or write recovery set containing the identified memory operation. In at least one embodiment, this identifier may be the tag to be assigned to the next rollback point, such as an exemplary next BTAG 712. Then at 1308, the memory access operations are processed in conjunction with the unique identifier identifying the first recovery set that contains this access. The identifier memory access is passed through the microprocessor in conjunction with this identifier, such as a BTAG associated to a load or store, so that it will be available when an update to the transaction's read or write set is to be performed, e.g., in conjunction with method 1000 of FIG. 10. The unique id can correspond to any identifier, tag, tracking number or other mechanism to identify recovery sets and/or rollback points in conjunction with at least one present embodiment. In the preferred embodiment discussed herein it has generally been a branch tag (BTAG) for example purposes only. However, in other embodiments it may be another instruction tag or a global completion table (GCT) id. This unique id assigned to the memory instruction in particular is the same id that is labeled next BTAG 712 (FIG. 7). When a memory read or write instruction is decoded, the next BTAG conceptually associated to the active set (and the next recovery set to be created) is assigned to that load or store instruction. For example, the unique id that is referenced in the marking flow of FIG. 10 is the BTAG corresponding to the current load or the current store assigned in accordance with the present method.

In accordance with some embodiments, there is a limited number of recovery sets available. As such, when an instruction should have a recovery set associated with it is being decoded, no storage locations that may store a recovery set are available on the chip. For example with respect to FIG. 8, 8 recovery sets 714 (FIG. 8) are depicted. When all the 8 recovery sets 714 (FIG. 8) have been used, another branch that may have been mispredicted cannot be allocated another recovery set. As such, according to one embodiment, there may be logic to deallocate some other set of the recovery set 714 (FIG. 8) to force to make a recovery set available. If this happens and a future rollback request is received for a tag (i.e. BTAG) that has been deallocated then the next sequential recovery set that was allocated after the recovery set that has been reused is used to provide the snapshot of the recovery set. Therefore, since the next sequential recovery set is a superset of the deallocated recovery set, the next sequential recovery set may contain an overindication. As such, the next sequential recovery set may contain additional elements in its read or write sets and lead to overindication and performance degradation.

In another aspect of the present embodiment, active recovery sets may be deallocated to create available recovery sets to be allocated. A special case for deallocating recovery sets that are still in use is to deallocate the oldest pointer in a circular buffer (i.e., use the recovery set at the tail pointer). In some instances, recovery sets may be searched for in a loop, and if none are found then the search loop would finish and the last recovery set will have been found to be used as a stand in or a superset for even older recovery sets that have been deallocated.

If recovery sets in the middle are deallocated, then logic needs to be present to identify what the next successor that is still available in terms of recovery sets. When some interior recovery set is deallocated, a numerical property may be used (such as when a BTAGs or other recovery sets are used that are numerically incremental, the first set available with a higher tag may be used). If no suitable recovery set is found, then an active set may be used since an active set is always a suitable superset.

For example, if a recovery set number 5 has been deallocated then there must be logic to identify that when a rollback to recovery set number 5 is to be performed, then recovery set number 6 would be selected. If recovery set number 6 has already been similarly deallocated, then the logic selects recovery set number 7 as a superset of the recovery set number 5, and so forth. If no suitable recovery set is found, the active set may be used. Another possible implementation for running out of recovery sets is to not allocate a recovery set for a rollback point, but rather reuse the next future recovery set number for the next successive recovery set. As such, a recovery set would be skipped for an instruction that may trigger a roll back. Then when that instruction does rollback, the successor recovery set will automatically be picked since the number has not been incremented for its successor. Another implementation, however less desirable, may be to stall the processor until a recovery set becomes available.

In some embodiments, an implementation advantageously does not to act immediately on a detected interference in the active set if the interference is not present in the recovery set since the interference may resolve itself when a flush occurs. Instead, the address causing the interference may be removed from the current transaction's read and write set of the local processor when a branch misprediction or other roll back occurs. In accordance with some such embodiments, interference is always checked against the currently active generation. For example, when a remote processor's request for a data item is received and that data item is found to be in the transaction's active set's read or write set then an interference is indicated and processing operations associated with such interference are taken which may include aborting either the local or remote transaction. In another embodiment, interference is checked against all prior generations. If it interferes with the present generation, but not a past generation, then processing of an interference is delayed. In one embodiment, processing such interferences is delayed for a fixed interval. In another embodiment, processing such interferences is delayed until the interference is no longer speculative, by ensuring that all branches that correspond to generations not showing an interference have successfully completed (i.e., the interference is actual, and not against speculative state).

Figure 14:
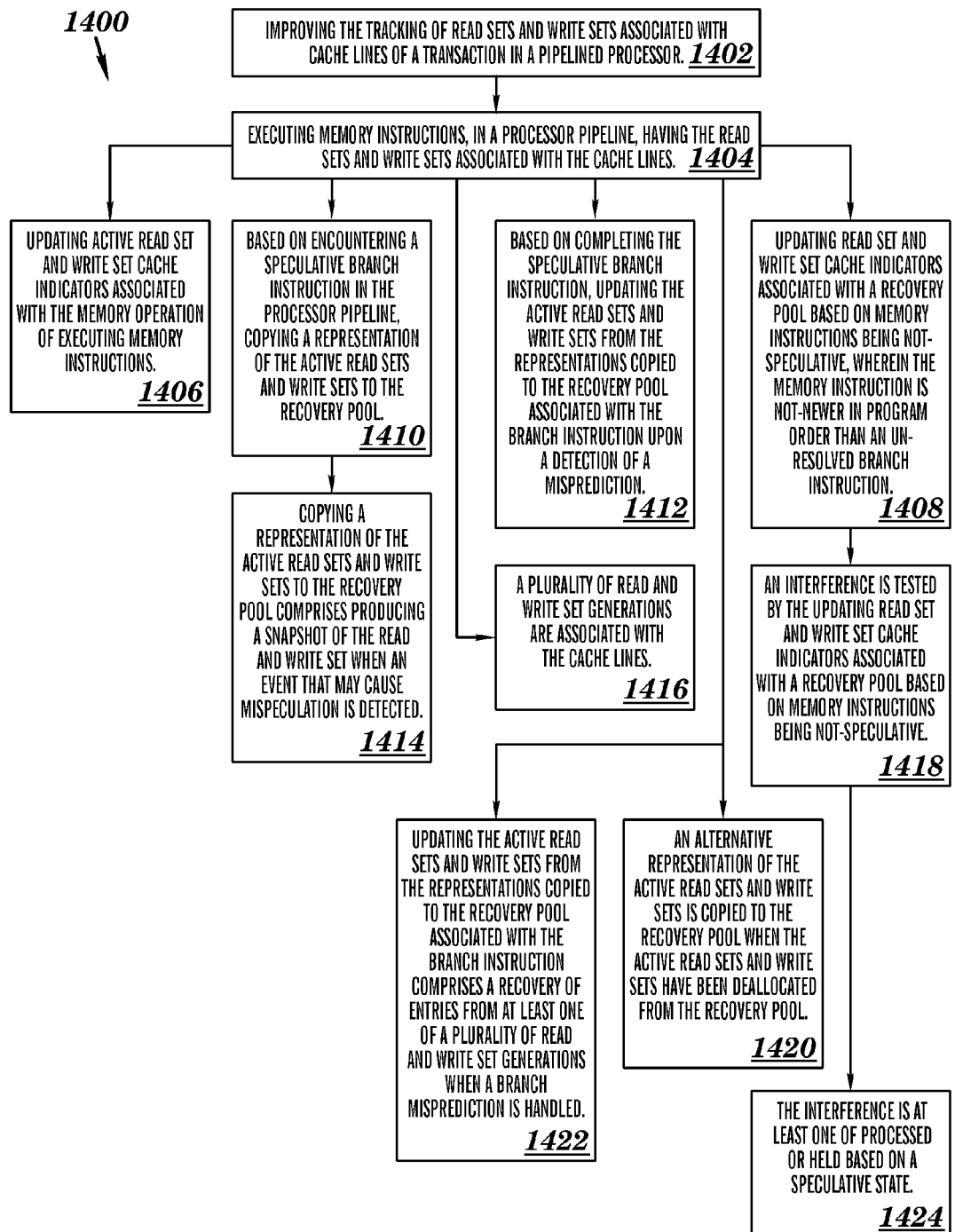
FIG. 14 depicts an exemplary flowchart that illustrates improving the tracking of read sets and write sets associated with a cache lines of a transaction in a pipelined processor, in accordance with present embodiments.

Referring now to FIG. 14, an exemplary flowchart 1400 that illustrates improving the tracking of read sets and write sets associated with a cache lines of a transaction in a pipelined processor 1402 is depicted. According to at least one embodiment, memory instructions may be executed, in a processor pipeline, having the read sets and write sets associated with the cache lines 1404. Also included is updating active read set and write set cache indicators associated with the memory operation of executing memory instructions 1406 and updating read set and write set cache indicators associated with a recovery pool based on memory instructions being not-speculative, wherein the memory instruction is not-newer in program order than an unresolved branch instruction 1408. Based on encountering a speculative branch instruction in the processor pipeline, copying a representation of the active read sets and write sets to the recovery pool 1410 and based on completing the speculative branch instruction, updating the active read sets and write sets from the representations copied to the recovery pool associated with the branch instruction upon a detection of a misprediction 1412. Further included is the copying a representation of the active read sets and write sets to the recovery pool which comprises producing a snapshot of the read and write set when an event that may cause misspeculation is detected 1414. A plurality of read and write set generations are associated with the cache lines 1416. An interference is tested by the updating read set and write set cache indicators associated with a recovery pool based on memory instructions being not-speculative 1418 and an alternate representation of the active read sets and write sets is copied to the recovery pool when the active read sets and write sets have been deallocated from the recovery pool 1420. The updating the active read sets and write sets from the representations copied to the recovery pool associated with the branch instruction comprises a recovery of entries from at least one of a plurality of read and write set generations when a branch misprediction is handled 1422. The interference is at least one of processed or held based on a speculative state 1424.

Figure 15:
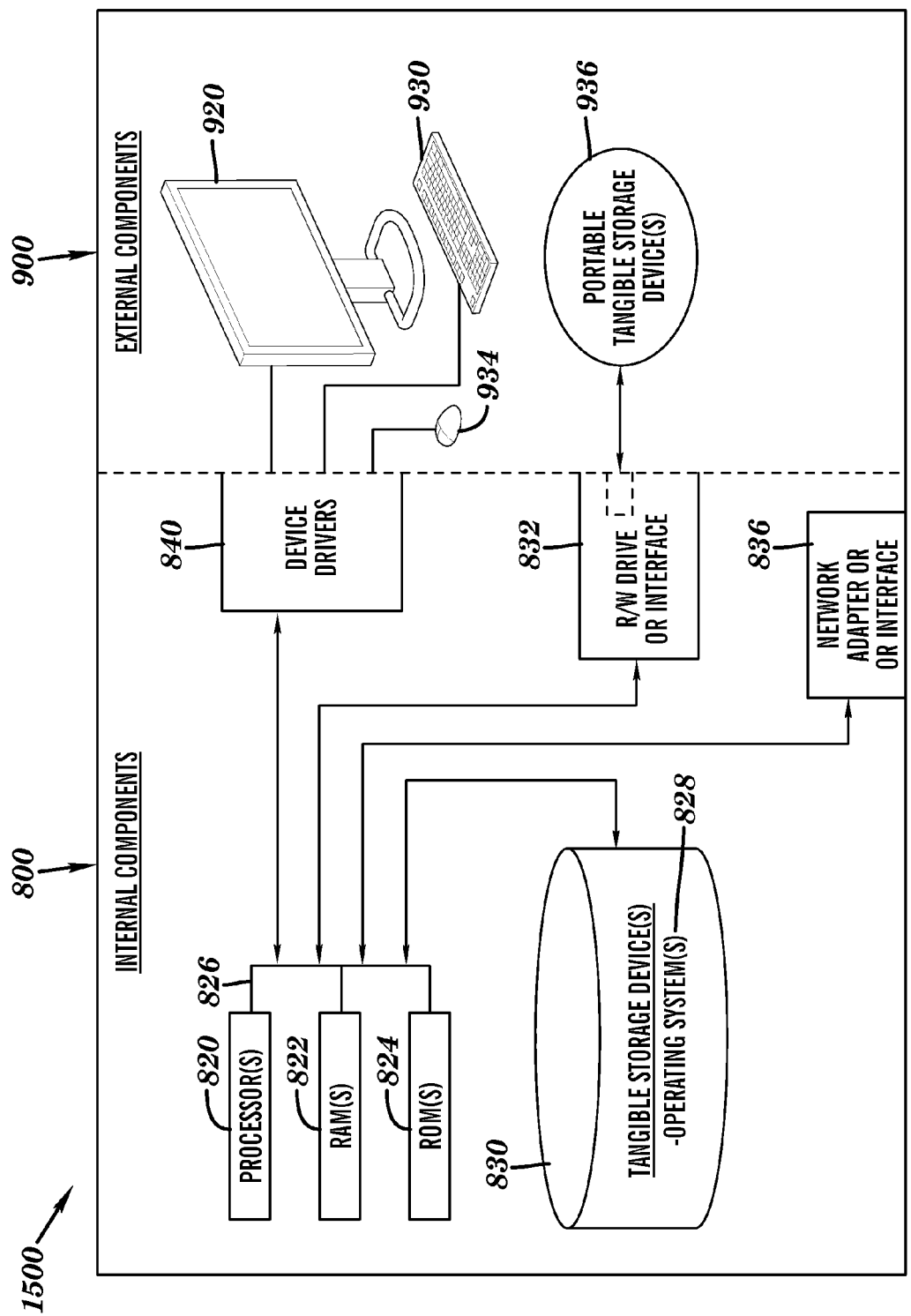
FIG. 15 depicts a block diagram of internal and external components of computers and servers, in accordance with present embodiments.

FIG. 15 is a block diagram 1500 of internal and external components of the hardware and the software of the computer environment according to the present embodiments. It should be appreciated that FIG. 15 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

A computer and network server may include respective sets of internal components 800 and external components 900. Each of the sets of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and software programs are stored on one or more of the respective computer-readable tangible storage devices 830 for execution by one or more of the respective processors 820 via one or more of the respective RAMs 822 (which typically include cache memory). In the embodiment illustrated in FIGS. 3-6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program can be stored on one or more of the respective portable computer-readable tangible storage devices 936, read via the respective R/W drive or interface 832 and loaded into the respective hard drive 830.

Each set of internal components 800 also includes network adapters or interfaces 836 such as a TCP/IP adapter cards, wireless wi-fi interface cards, or 3G or 4G wireless interface cards or other wired or wireless communication links A software program in a client computer can be downloaded to a client computer from an external computer via a network (for example, the Internet, a local area network or other, wide area network) and respective network adapters or interfaces 836. From the network adapters or interfaces 836, the software program in client computer is loaded into the respective hard drive 830. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present embodiment have been described with respect to block diagrams and/or flowchart illustrations of methods, apparatus (system), and computer program products according to present embodiments. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The foregoing description of various embodiments of the present embodiment has been presented for purposes of illustration and description. It is not intended to be exhaustive or to limit the embodiment to the precise form disclosed. Many modifications and variations are possible. Such modifications and variations that may be apparent to a person skilled in the art of the embodiment are intended to be included within the scope of the embodiment as defined by the accompanying claims.

Various embodiments of the embodiment may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although one or more examples have been provided herein, these are only examples. Many variations are possible without departing from the spirit of the present embodiment. For instance, processing environments other than the examples provided herein may include and/or benefit from one or more aspects of the present embodiment. Further, the environment need not be based on the z/Architecture®, but instead can be based on other architectures offered by, for instance, IBM®, Intel®, Sun Microsystems, as well as others. Yet further, the environment can include multiple processors, be partitioned, and/or be coupled to other systems, as examples.

As used herein, the term "obtaining" includes, but is not limited to, fetching, receiving, having, providing, being provided, creating, developing, etc.

The flow diagrams depicted herein are just examples. There may be many variations to these diagrams or the steps (or operations) described therein without departing from the spirit of the embodiment. For instance, the steps may be performed in a differing order, or steps may be added, deleted, or modified. All of these variations are considered a part of the claimed embodiment.

Although preferred embodiments have been depicted and described in detail herein, it will be apparent to those skilled in the relevant art that various modifications, additions, substitutions and the like can be made without departing from the spirit of the embodiment, and these are, therefore, considered to be within the scope of the embodiment, as defined in the following claims.

What is claimed is:

1. A computer implemented method for improving the tracking of read sets and write sets associated with cache lines of a transaction in a pipelined processor, the method comprising:
   executing memory instructions, in a processor pipeline, having the read sets and write sets associated with the cache lines comprising:
   updating active read set and write set cache indicators associated with the memory operation of executing memory instructions; and
   updating read set and write set cache indicators associated with a recovery pool based on memory instructions being not-speculative, wherein the memory instruction is not-newer in program order than an un-resolved branch instruction;
   based on encountering a speculative branch instruction in the processor pipeline, copying a representation of the active read sets and write sets to the recovery pool; and
   based on completing the speculative branch instruction, updating the active read sets and write sets from the representations copied to the recovery pool associated with the branch instruction upon a detection of a misprediction.

2. The method according to claim 1, wherein the copying a representation of the active read sets and write sets to the recovery pool comprises producing a snapshot of the read and write set when an event that may cause misspeculation is detected.

3. The method according to claim 1, wherein a plurality of read and write set generations are associated with the cache lines.

4. The method according to claim 1, wherein an interference is tested by the updating read set and write set cache indicators associated with a recovery pool based on memory instructions being not-speculative.

5. The method according to claim 1, wherein an alternate representation of the active read sets and write sets is copied to the recovery pool when the active read sets and write sets have been deallocated from the recovery pool.

6. The method according to claim 1, wherein the updating the active read sets and write sets from the representations copied to the recovery pool associated with the branch instruction comprises a recovery of entries from at least one of a plurality of read and write set generations when a branch misprediction is handled.

* * * * *